(12) United States Patent
Darmann

(10) Patent No.: US 8,553,384 B2
(45) Date of Patent: Oct. 8, 2013

(54) FAULT CURRENT LIMITER

(75) Inventor: Francis Anthony Darmann, Chatswood (AU)

(73) Assignee: Zenergy Power Pty Ltd, Wollongong (AU)

(*) Notice: Subject to any disclaimer, the term of this patent is extended or adjusted under 35 U.S.C. 154(b) by 0 days.

(21) Appl. No.: 13/215,647

(22) Filed: Aug. 23, 2011

(65) Prior Publication Data
US 2012/0040839 A1 Feb. 16, 2012

Related U.S. Application Data

(63) Continuation of application No. 12/866,321, filed as application No. PCT/AU2009/000409 on Apr. 3, 2009, now Pat. No. 8,027,135.

(30) Foreign Application Priority Data

Apr. 3, 2008 (AU) .............................. 2008 901584
Mar. 16, 2009 (AU) .............................. 2009 901138

(51) Int. Cl.
*H02H 9/02* (2006.01)
(52) U.S. Cl.
USPC ........................................................ 361/93.5
(58) Field of Classification Search
None
See application file for complete search history.

(56) References Cited

U.S. PATENT DOCUMENTS

| | | | |
|---|---|---|---|
| 3,221,280 A | 11/1965 | Malsbary et al. | |
| 4,117,524 A | 9/1978 | Parton et al. | |
| 5,523,673 A * | 6/1996 | Ratliff et al. | 323/206 |
| 5,636,113 A * | 6/1997 | Ray | 363/54 |
| 5,930,095 A * | 7/1999 | Joo et al. | 361/58 |
| 6,016,094 A | 1/2000 | Gerhold | |
| 6,795,282 B2 * | 9/2004 | Neumuller et al. | 361/19 |
| 6,809,910 B1 | 10/2004 | Yuan et al. | |
| 7,193,825 B2 | 3/2007 | Darmann et al. | |
| 2002/0018327 A1 | 2/2002 | Walker et al. | |
| 2006/0158803 A1 * | 7/2006 | Friedman et al. | 361/58 |
| 2007/0115598 A1 * | 5/2007 | Darmann et al. | 361/19 |
| 2009/0021875 A1 * | 1/2009 | Wolfus et al. | 361/58 |
| 2010/0309590 A1 * | 12/2010 | Darmann | 361/19 |

FOREIGN PATENT DOCUMENTS

| | | |
|---|---|---|
| GB | 2 025 149 | 1/1980 |
| WO | 2004/068670 | 8/2004 |
| WO | 2007/029224 | 3/2007 |

OTHER PUBLICATIONS

He et al., "The High Voltage Problem in the Saturated Core HTS Fault Current Limiter", Physica C: Superconductivity, vol. 386, Apr. 15, 2003, pp. 527-530.

* cited by examiner

*Primary Examiner* — Rexford Barnie
*Assistant Examiner* — Angela Brooks
(74) *Attorney, Agent, or Firm* — Fay Kaplun & Marcin, LLP

(57) ABSTRACT

A fault current limiter (FCL) includes a series of high permeability posts for collectively define a core for the FCL. A DC coil, for the purposes of saturating a portion of the high permeability posts, surrounds the complete structure outside of an enclosure in the form of a vessel. The vessel contains a dielectric insulation medium. AC coils, for transporting AC current, are wound on insulating formers and electrically interconnected to each other in a manner such that the senses of the magnetic field produced by each AC coil in the corresponding high permeability core are opposing. There are insulation barriers between phases to improve dielectric withstand properties of the dielectric medium.

16 Claims, 43 Drawing Sheets

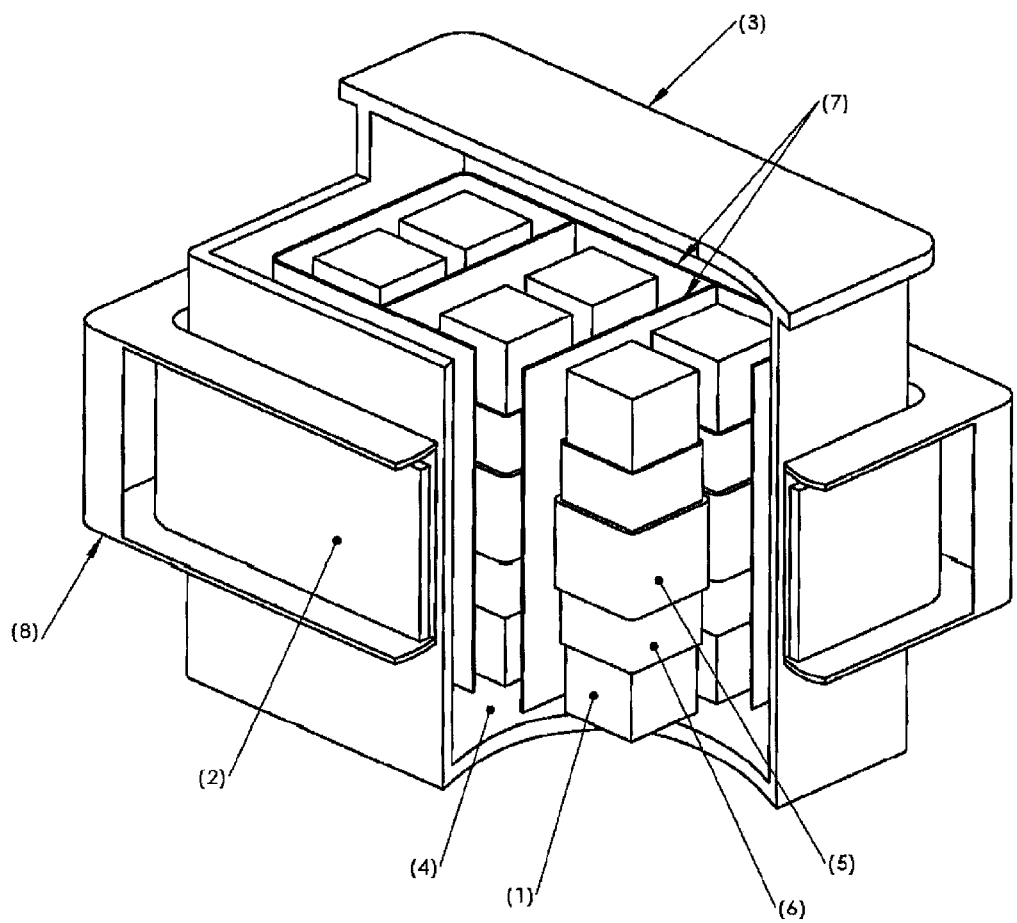
Figure 7.
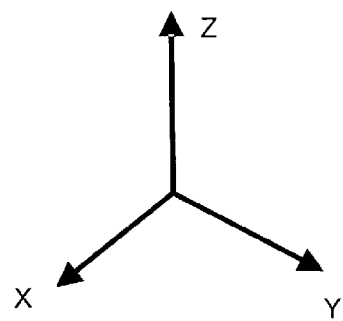

FAULT CURRENT LIMITER

PRIORITY CLAIM

The present application is a Continuation of U.S. patent application Ser. No. 12/866,321 filed on Aug. 5, 2010 now U.S. Pat. No. 8,027,135; which is a National Phase Application of PCT Application Serial No. PCT/AU2009/000409 filed on Apr. 3, 2009 which claims the benefit of AU Patent Application Serial No. 2009 901138 filed on Mar. 16, 2009 and AU Patent Application Serial No. 2008 901584 filed on Apr. 3, 2008, the disclosure of these applications is hereby incorporated herein by reference.

GOVERNMENT RIGHTS

The United States Government has certain rights in the invention pursuant to a contract with the U.S. Department of Energy.

FIELD OF THE INVENTION

The present invention relates to a fault current limiter.

The invention has been developed primarily for a high voltage saturated core fault current limiter and will be described with reference to that application. However, the invention is not limited to that particular field of use and is also suitable for low voltage, medium voltage, extra-high voltage and ultra-high voltage fault current limiters.

BACKGROUND OF THE INVENTION

Saturated core fault current limiters (FCLs) are known. Examples of superconducting fault current limiting devices include:
U.S. Pat. No. 7,193,825 to Darmann et al.
U.S. Pat. No. 6,809,910 to Yuan et al.
U.S. Pat. No. 7,193,825 to Boenig,
US Patent Application Publication Number 2002/0018327 to Walker et al.

The fault current limiters described are for use with dry insulation type copper coil arrangements and, in practical terms, only suitable for DC saturated FCLs which employ air as the main insulation medium. That is, the main static insulation medium between the AC phase coils in a polyphase FCL and between the AC phase coils and the steel core, DC coil, cryostat, and main structure is provided by a suitable distance in air. This substantially limits the FCL to a "dry type" insulation technologies. Dry type technologies normally refers to those transformer construction techniques which employ electrically insulated copper coils but only normal static air and isolated solid insulation barrier materials as the balance of the insulation medium. In general, air forms the majority of the electrical insulation material between the high voltage side and the grounded components of the FCL. These grounded components include the steel frame work and the case.

The utilisation of dry type insulation limits the FCL to lower voltage ranges of AC line voltages of up to approximately 39 kV. Dry type transformers and reactors are only commercially available up to voltage levels of about 39 kV. As a result, the current demonstrated technology for DC saturated FCL's is not suitable for extension into high voltage versions. Dry type designs result in an inability to design a practically sized compact structure using air as an insulation medium when dealing with higher voltages.

One of the main emerging markets for FCL's is the medium to high voltage (33 kV to 166 kV) and extra-high voltage range (166 kV to 750 kV). When operating within these voltage ranges, the currently described art and literature descriptions of DC saturated FCL's are not practical. The main reason is due to static voltage design considerations—for example, the breakdown of the air insulation medium between the high voltage copper coils and the cryostat or steel core or DC coil. High voltage phase coils at medium to high voltages (greater than 39 kV) often need to be immersed in one of
  An insulating gas (such as $SF_6$, nitrogen, or the like).
  A vacuum (better than $10^{-3}$ mbar).
  A liquid such as a synthetic silicone oil, vegetable oil, or other commonly available insulating oils used in medium, high voltage, and extra-high voltage transformer and reactor technology.

When a high voltage device is immersed in such an insulating medium, that medium is often referred to as the "bulk insulation medium" or the "dielectric".

Typically, the dielectric will have a relative permittivity of the order of about 2 to 4, except for a vacuum which has a relative permittivity equal to 1. These so called dielectric insulation media have electrostatic breakdown strength properties which are far superior to that of atmospheric air if employed judiciously by limiting the maximum distance between solid insulation barriers and optimising the filled dielectric distance with respect to the breakdown properties of the particular liquid or gaseous dielectric.

The commonly available bulk insulating gases and liquids typically have a breakdown strength in the order of 10 to 20 kV/mm but are usually employed such that the average electric field stress does not exceed about 6 to 10 kV/mm. This safety margin to the breakdown stress value is required because even if the average electrostatic field stress is 6 to 10 kV/mm, the peak electrostatic field stress along any isostatic electric field line may be 2 to 3 times the average due to various electrostatic field enhancement effects.

In general, there are five main desirable requirements of a dielectric liquid or gas for high voltage bulk insulation requirements in housed plant such as transformers and reactors and fault current limiters:
  The dielectric must show a very high resistivity.
  The dielectric losses must be very low.
  The liquid must be able to accommodate solid insulators without degrading that solid insulation (for example, turn to turn insulation on coil windings or epoxy).
  The electrical breakdown strength must be high,
  The medium must be able to remove thermal energy losses.

Solid insulation techniques are not yet commonly available at medium to high voltages (that is, at operating voltages greater than 39 kV) for housed devices such as transformers, reactors and fault current limiters. The shortcoming of solid insulation techniques is the presence of the inevitable voids within the bulk of the solid insulation or between surfaces of dissimilar materials such as between coil insulation and other solid insulation materials. It is well known that voids in solid insulation with high voltages produce a high electric stress within the void due the field enhancement effect. This causes physical breakdown of the surrounding material due to partial discharges and can eventually lead to tracking and complete device failure.

It will be recognized that a DC saturated belt current limiter which employs a single or multiple DC coils for saturating the steel core, such as those disclosed in the aforementioned prior art, poses fundamental problems when the copper AC phase coils can no longer be of a "dry type" construction or when the main insulation medium of the complete device is air. A significant problem in such arrangements is the presence of the steel cryostat for cooling the DC HTS coil and the DC HTS coil itself. The cryostat and the coil and the steel cores are essentially at ground potential with respect to the AC phase coils.

As a side issue, but one which enhances the insulation requirements for all high voltage plant and equipment, it is that basic insulation design must also meet certain electrical engineering standards which test for tolerance to various types of over-voltages and lighting impulses over predetermined time periods. An example, in Australia, of such standards are as follows:

AS2374 Part3. Insulation levels and dielectric tests which includes the power frequency (PF) and lightning impulse (LI) tests of the complete transformer.

AS2374 Part 3.1. Insulation levels and dielectric tests—External clearances in air.

AS2374 Part 5. Ability to withstand short-circuit.

These standards do not form an exhaustive list of the standards that high voltage electric equipment must meet. It is recognised that each country has their own standards which cover these same design areas and reference to an individual country's standard does not necessarily exclude any other country's standards. Ideally a device is constructed to meet multiple countries standards.

Adherence to these standards result in a BIL (Basic Insulation level) for the device or a "DIL" (Design Insulation Level) which is usually a multiple of the basic AC line voltage. For example, a 66 kV medium voltage transformer or other housed device such as a FCL may have a BIL of 220 kV. The requirement to meet this standard results in a static voltage design which is more strenuous to meet practically than from a consideration of the AC line voltage only. The applicable standards and this requirement has resulted from the fact that a practical electrical installation experiences temporary over voltages which plant and devices may experience within a complex network, for example lightning over voltages, and switching surges. Hence, all equipment on an electrical network has a BIL or DIL appropriate for the expected worst case transient voltages.

An initial consideration of the static design problem for high voltage DC saturated fault current limiters may result in the conclusion that the problem is easily solved by housing only the high voltage AC copper coils in a suitable electrical insulating gas or liquid. However, the problem with this technique is that the steel core must pass through the container which holds the gas or liquid. Designing this interface for long term service is difficult to solve mechanically. However, more importantly solving the interface problem electrostatically is much more complex and any solution can be prone to failure or prove uneconomical. The problem is that as a seal must be developed between the vessel containing the dielectric fluid and the high permeability core or, alternatively, a method of isolating the HTS cryostat from the fluid.

Another possibility is the use of solid high voltage barriers between phases and between phases and the steel core and cryostat or a layer of high voltage insulation around the copper phase coils and in intimate contact with the phase coils. However, this has a significant deleterious side effect. It is known that the static electric field in a combination of air and other materials with a higher relative permittivity is that this always results in an enhanced electric field in the material or fluid with the lower permittivity (that is air). For example, consider a conductive copper cylinder with a layer of normal insulation to represent the turn to turn insulation, according equation 1:

$$E_x = \frac{U_m}{x \left\{ \frac{\ln\left[\frac{R}{r}\right]}{\frac{\varepsilon_1}{\varepsilon_2}} + \frac{\ln\left[\frac{d}{R}\right]}{1} \right\}} \quad \text{Equation 1}$$

where:
$U_m$=AC phase voltage with respect to ground.
R=radius of a copper cylinder including outside insulation [mm].
R=radius of bare copper cylinder [mm],
D=distance from center of cylinder to the nearest ground plane [mm].
$\varepsilon_2$=relative dielectric constant of the insulation covering the cylinder
$\varepsilon_1$=relative dielectric constant of the bulk insulation where the cylinder is immersed (which equals 1 for air),
x=distance from the center of cylinder to a point outside the cylinder [mm],
$E_x$=Electrostatic field gradient at point x[kV/mm].

The field enhancement effect is represented by the factor $\varepsilon_2/\varepsilon_1$ and is of the order 2 to 4 for common everyday materials except for the case of employing a vacuum which has a relative permittivity equal to 1. By providing additional solid or other insulation material (of higher electric permittivity than air) there is an increase in the electrostatic stress in the bulk air insulation of the FCL. The better the quality of the high voltage insulation, the higher the field enhancement effect.

Hence, solid dielectric insulation barriers in an otherwise air insulated FCL are not a technically desirable option for high voltage FCL's at greater than 39 kV and indeed one does not see this technique being employed to make high voltage dry type transformers at greater than 39 kV for example. In fact, no techniques have been found highly suitable to date and that is why high voltage transformers above 39 kV are insulated with a dielectric liquid or gas.

The discussion above is the reason why housed high voltage electrical equipment is often completely immersed in electrically insulating dielectric fluid or gas. That is, the insulated copper coils and the steel core of transformers and reactors are housed within a container that is then completely filled with a dielectric medium which is a fluid. This substantially reduces the electrostatic voltage design problems detailed in the above discussion. The insulating medium (for example oil, vacuum, or $SF_6$) fills all of the voids and bulk distances between the high voltage components and the components which are essentially at ground or neutral potential. In this case, solid insulation barriers may be incorporated into the bulk insulating dielectric and for many liquids such as oil, dividing the large distances with solid insulation improves the quality of the overall electrostatic insulation by increasing the breakdown field strength of the dielectric fluid. This is because the relative permittivity of the oil and solid insulation are very close to each other (so field enhancement effects are lessened compare to air) and the breakdown voltage of the bulk dielectric medium (expressed in kV/mm) improves for smaller distances between the insulation barriers.

A major problem with the full immersion technique is that it is not readily adaptable to a DC saturated FCL designs or other devices that incorporated a superconductor coil as the DC saturating element. This is because the superconducting coil and its cryostat or vacuum vessel are a component of the FCL which must also necessarily be immersed in the dielectric fluid.

The established body of literature clearly points to four main criteria for a marketable, feasible, and manufacturable FCL:

- It must have a low insertion impedance so that it is invisible to the network when there are no faults and when providing peak power flow.
- It must not produce more than 0.5% THD worth of harmonics (Total harmonic distortion) or as required by the end user.
- It must provide a suitable clip of the fault current, between 20 to 80%.
- The design must be augmentable to high AC voltages (greater than 6 kV) and high AC current (greater than 0.6 kA).

The classic saturable core FCL designs detailed in the prior art suffer the major drawbacks of not being suitable for high voltage and high AC current designs. Both of these disadvantages originate from the lack of a coolant (other than air) and/or a liquid or gaseous dielectric.

Even if a liquid or gaseous dielectric is employed in the classic saturable FCL design, there is still required significant augmentation to allow access to the cryocooler, cryostat, and cryostat fittings. In addition, special seals to isolate the cryostat feed-throughs (electrical power, electrical signals) from the dielectric have to be made and tested.

In high AC current designs, the cross sectional area of copper required to conduct the required electrical current is much higher when considering only an air cooled design. It is not unusual for this cross section area to be up to five times higher. This can make the dimensions of the AC coil too large to be accommodated into the minimum core frame yoke size, requiring a larger yoke to maintain electrostatic clearance. This increases the footprint and mass of the classic air cooled/ air insulated saturable FCL.

Any discussion of the prior art throughout the specification should in no way be considered as an admission that such prior art is widely known or forms part of common general knowledge in the field.

SUMMARY OF THE INVENTION

It is an object of the preferred embodiments of this invention to ameliorate one or more of the aforementioned disadvantages or to provide a useful alternative.

It is another object of the preferred embodiments of the invention to overcome one or more of the above-stated disadvantages by inverting the conventional relative locations of the AC and DC coils with an FCL. These embodiments allow the complete structure to be immersed in a dielectric.

According to a first aspect of the invention there is provided a high voltage fault current limiter which includes a magnetically saturable core and at least one AC phase coil wound around a portion of said saturable core wherein said magnetically saturable core and said at least one AC phase coil are housed within an enclosure and a DC biasing coil is disposed outside of and surrounding said enclosure which during no fault operating conditions of said current limiter biases said core into magnetic saturation for low steady state un-faulted insertion impedance but during fault conditions takes said core out of magnetic saturation to thereby provide an increased current limiting impedance in said electrical circuit.

In an embodiment, the high permeability core is selected from one or more of a transformer steel lamination material; a mild steel; or other forms of magnetic steel, ferrite materials or a ferromagnetic material.

In an embodiment, the core is in the form of a rectangular array of core posts with AC phase coils wound one each on respective ones of the core posts and electrically interconnected in a manner such that the senses of the magnet fields produced by the AC coils are opposing.

In an embodiment, the fault current limiter includes a vessel surrounding the AC coils for containing a dielectric insulation medium and cooling medium for said AC coils.

In an embodiment, the DC coil is a superconductor and more preferably a high temperature superconductor housed in a cryostat and cooled by a cryocooler.

In an embodiment, the DC biasing coil is coincident with a coaxial with the AC phase coils so that said portion of the saturable core is fully saturated.

In an embodiment, the magnetically saturable core and AC coils are immersed in a dielectric which is in the form of a solid, liquid or gas and including air at any atmosphere including vacuum.

In an embodiment, the core posts are rectangular in cross-section and of constant cross-section along the lengths thereof.

In an embodiment, the magnetically saturable core is constructed from a transformer steel lamination material, mild steel or other magnetic steel, ferrite material, an insulated high permeability compressed powder, or a ferromagnetic material.

In an embodiment, the core posts are tapered toward the ends thereof whereby during no fault operation of the current limiter substantially all of said core is saturated.

According to a second aspect of the invention there is provided a fault current limiter including:

an input terminal for electrically connecting to a power source that provides a load current;

an output terminal for electrically connecting with a load circuit that draws the load current;

a magnetically saturable core;

an AC coil wound about a longitudinal portion of the core for carrying the load current between the input terminal and the output terminal; and at least one DC coil for inducing a magnetic field in at least the portion of the core and extending about a longitudinal intermediate zone that receives the core and the AC coil, wherein the field magnetically biases the core such that the AC coif moves from a low impedance state to a high impedance state in response to one or more characteristics of the load current.

In an embodiment, in the low impedance state, the portion is magnetically saturated.

In an embodiment, in the low impedance state, the core is magnetically saturated longitudinally beyond the portion.

In an embodiment, in the high impedance state, the portion is out of magnetic saturation.

In an embodiment, in the low impedance state, the impedance of the AC coil is substantially equal to the theoretical air core impedance of the AC coil.

In an embodiment, one of the one or more characteristics is an increase of the load current beyond a predetermined current value.

In an embodiment;

the core includes a plurality of posts;

the longitudinal portion is segmented between the posts; and the AC coil includes a plurality of coil segments that are wound about respective posts.

In an embodiment, the posts are parallel

In an embodiment, the posts extend longitudinally.

In an embodiment, each post has a substantially uniform transverse cross-section.

In an embodiment, the posts have substantially like transverse cross-sections.

In an embodiment, the transverse cross-section of the posts has at least one axis of symmetry.

In an embodiment, the transverse cross-sections of the posts are symmetric.

In an embodiment, the posts substantially co-extend within the intermediate zone.

In an embodiment, the posts are spaced apart from each other.

In an embodiment, the posts extend longitudinally beyond the DC coils.

In an embodiment, the coil segments substantially longitudinally coextend in the intermediate zone.

In an embodiment, the AC coil extends longitudinally beyond the DC coils.

In an embodiment, each post extends longitudinally beyond the respective AC coil.

In an embodiment, the load current includes three phases and the fault current limiter includes three pairs of input terminals and output terminals for the respective phases.

In an embodiment, the fault current limiter includes six posts arranged in three pairs, where each pair of posts is associated with a respective pair of input and output terminals for carrying the corresponding phase of the load current.

In an embodiment, the posts in each pairs of posts are yoked together.

In an embodiment, each post includes longitudinal ends, and at least one end of each posts is yoked to an adjacent end of the other post in the same pair.

In an embodiment, both ends of each posts are yoked to respective adjacent ends of the other post in the same pair.

In an embodiment, the posts are yoked magnetically and physically by a high permeability material.

In an embodiment, the posts in each pair are adjacent each other and include spaced apart opposing faces.

In an embodiment, the opposing faces are substantially planar.

In an embodiment, the opposing faces are substantially parallel.

In an embodiment, the opposing faces are substantially coextensive.

In an embodiment, the fault current limiter includes an enclosure for defining the intermediate zone.

In an embodiment, the enclosure contains a dielectric material.

In an embodiment, the AC coil is received within the dielectric.

In an embodiment, the DC coils each include a high conductivity material.

In an embodiment, the high conductivity material is selected from: copper; aluminium; a high temperature superconductive material; a low temperature superconductive material.

According to a third aspect of the invention there is provided a method of limiting current including the steps of:

providing an input terminal for electrically connecting to a power source that provides a load current;

providing an output terminal for electrically connecting to a load circuit that draws the load current;

providing a magnetically saturable core;

winding an AC coil about a longitudinal portion of the core for carrying the load current between the input terminal and the output terminal; and inducing a magnetic field in at least the portion of the core with at least one DC coil, wherein the DC coil extends about a longitudinal intermediate zone that receives the core and the AC coil, and wherein the field magnetically biases the core such that the AC coil moves from a low impedance state to a high impedance state in response to one or more characteristics of the load current.

According to a fourth aspect of the invention there is provided a fault current limiter including:

an input terminal for electrically connecting to a power source that provides a load current;

an output terminal for electrically connecting with a load circuit that draws the load current;

a magnetically saturable core;

an AC coil wound about a longitudinal portion of the core for carrying the load current between the input terminal and the output terminal; and at least one DC coil that is in an open-core arrangement with the AC coil for inducing a magnetic field in at least the portion of the core, the DC coil extending about a longitudinal intermediate zone that receives the core and the AC coil, wherein the field magnetically biases the core such that the AC coil moves from a low impedance state to a high impedance state in response to one or more characteristics of the load current.

According to a fifth aspect of the invention there is provided a method of limiting current using a fault current limiter, the method including:

electrically connecting a power source to an input terminal for providing a load current;

electrically connecting a load circuit to an output terminal for drawing the load current;

providing a magnetically saturable core;

providing an AC coil wound about a longitudinal portion of the core for carrying the load current between the input terminal and the output terminal; and providing at least one DC coil that is in an open-core arrangement with the AC coil for inducing a magnetic field in at least the portion of the core, the DC coil extending about a longitudinal intermediate zone that receives the core and the AC coil, wherein the field magnetically biases the core such that the AC coil moves from a low impedance state to a high impedance state in response to one or more characteristics of the load current.

According to a sixth aspect of the invention there is provided a fault current limiter including:

three input terminals for electrically connecting to respective phases of a three phase power source that provides a three phase load current;

three output terminals for electrically connecting with the respective phases of a load circuit that draws the load current;

a magnetically saturable core having three pairs of posts, each post having a longitudinal portion;

three AC coils wound about the portions of respective pairs of posts for carrying the load current between the input terminals and the output terminals; and at least one DC coil for inducing a magnetic field in at least the portions and extending about a longitudinal intermediate zone that receives the posts and the AC coils, wherein the field magnetically biases the core such that the AC coil moves from a low impedance state to a high impedance state in response to one or more characteristics of the load current.

In an embodiment, each AC coil includes two coil segments that are each wound about respective portions of the posts in the pair of posts.

According to a seventh aspect of the invention there is provided a method of limiting current using a fault current limiter, the method including the steps of:

electrically connecting to respective phases of a three phase power source three input terminals for providing a three phase load current;

electrically connecting with the respective phases of a load circuit three output terminals for drawing the load current;

providing a magnetically saturable core having three pairs of posts, each post having a longitudinal portion;

providing three AC coils wound about the portions of respective pairs of posts for carrying the load current between the input terminals and the output terminals; and providing at least one DC coil for inducing a magnetic field in at least the portions and extending about a longitudinal intermediate zone that receives the posts and the AC coils, wherein the field magnetically biases the core such that the AC coil moves from a low impedance state to a high impedance state in response to one or more characteristics of the load current.

According to an eighth aspect of the invention there is provided core for a fault current limiter, the core including at least one longitudinally extending post having at least two portions that are magnetically saturable and which, in use, are received within respective coil segments of an AC coil that, in turn, is received within a DC coil.

In an embodiment, the portions are spaced apart.

In an embodiment, the cure includes two like parallel posts having respective portions.

In an embodiment, the posts are yoked.

In an embodiment, the posts are yoked to each other.

In an embodiment, each post extends between a first end and a second end, wherein the first end and second end of one of the posts are adjacent to the first end and the second respectively of the other post.

In an embodiment, the core includes a yoke for extending between the first ends for yoking the posts to each other.

In an embodiment, the core includes a further yoke for extending between the second ends for yoking the posts to each other.

In an embodiment, the posts include post laminations.

In an embodiment, the yokes include yoke laminations.

In an embodiment, the post laminations and the yoke laminations are interleaved.

In an embodiment, the core includes six longitudinally extending posts arranged in three pairs.

According to a ninth aspect of the invention there is provided a fault current limiter including a core of the eighth aspect of the invention.

According to a tenth aspect of the invention there is provided an electrical distribution system including at least one fault current limiter of one of the first, second, fourth, sixth and ninth aspects of the invention.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Currently preferred embodiments of the invention will now be described with reference to the following attached drawings in which:

FIG. 7 is a schematic cross-sectional view of a three phase open core fault current limiter according to said invention;

DETAILED DESCRIPTION OF THE PREFERRED EMBODIMENTS

While a number of embodiments are described below, further embodiments of the invention are disclosed in Australian Patent Application No. 2009901138 filed on 16 Mar. 2009 and from which priority is claimed. The detail of those embodiments is expressly incorporated herein by way of cross-reference.

The following description with reference to FIGS. 1 to 6 is intended to provide the addressee with context about the embodiments of the invention.

Firstly, it is mentioned that frequently used parametric features of the preferred embodiments include:

$A_{core}$: The cross sectional area of the high permeability cores under the AC coil $N_{ac}$: The number of AC turns, $N_{dc}$: The number of DC turns, $I_{dc}$: The DC coil current [Amps], $I_{ac}$: The AC coil current [Amps, rms]

f: The frequency of the electrical system $Z_b$: The base impedance of the electrical system that is being protected Z+: The positive sequence impedance of the system $I_{fp}$: The prospective fault current of the system $I_{fr}$: The desired reduced fault current The fault current limiting and the insertion impedance are functions of the above parameters.

It will be well known to those skilled in the art that magnetisation of a high permeability structure as required in the field of FCLs is prone to flux loss due to the following two main effects:

The fringing of the magnetic field lines around the DC bias coil and returning through a purely air path.

Partial air/core flux return where the flux enters the core but returns via an air path instead of a complete high permeability path.

Figure 1:
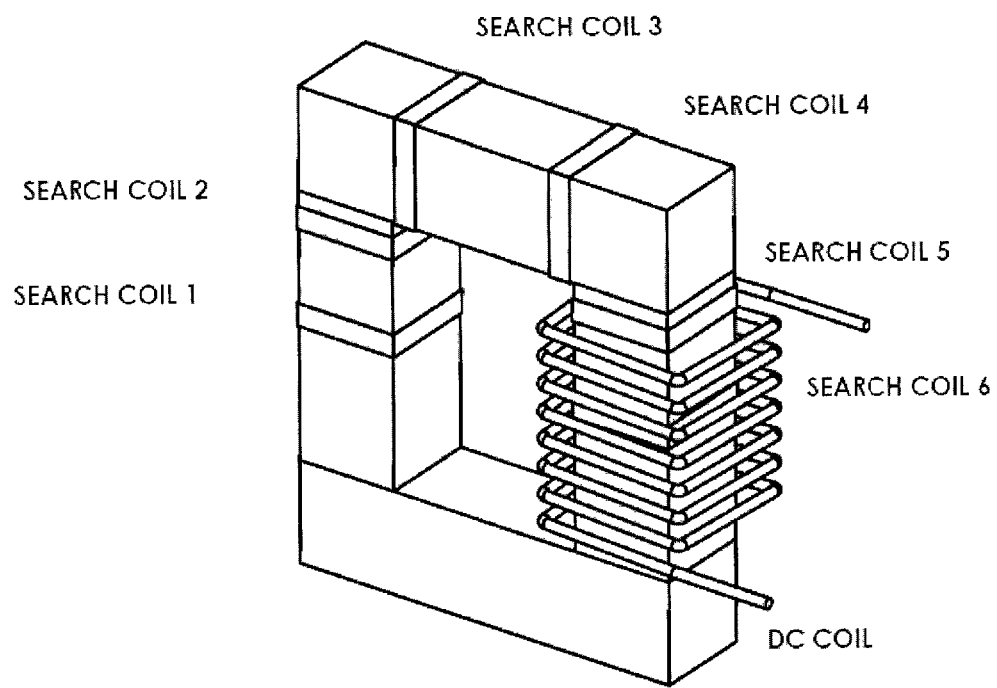
FIG. 1 is a schematic view of a an experimental FCL core structure.

For example, an FEA analysis was conducted on the core structure shown in FIG. 1. The relevant characteristics of this core structure are:

Window dimension width=290 mm.

Window dimension height=350 mm,

Material: M6 laminated steel core.

Laminations employed to construct core: 0.35 mm step lapped core structure.

Cross sectional area of core: 150 mm×150 mm.

Figure 2:
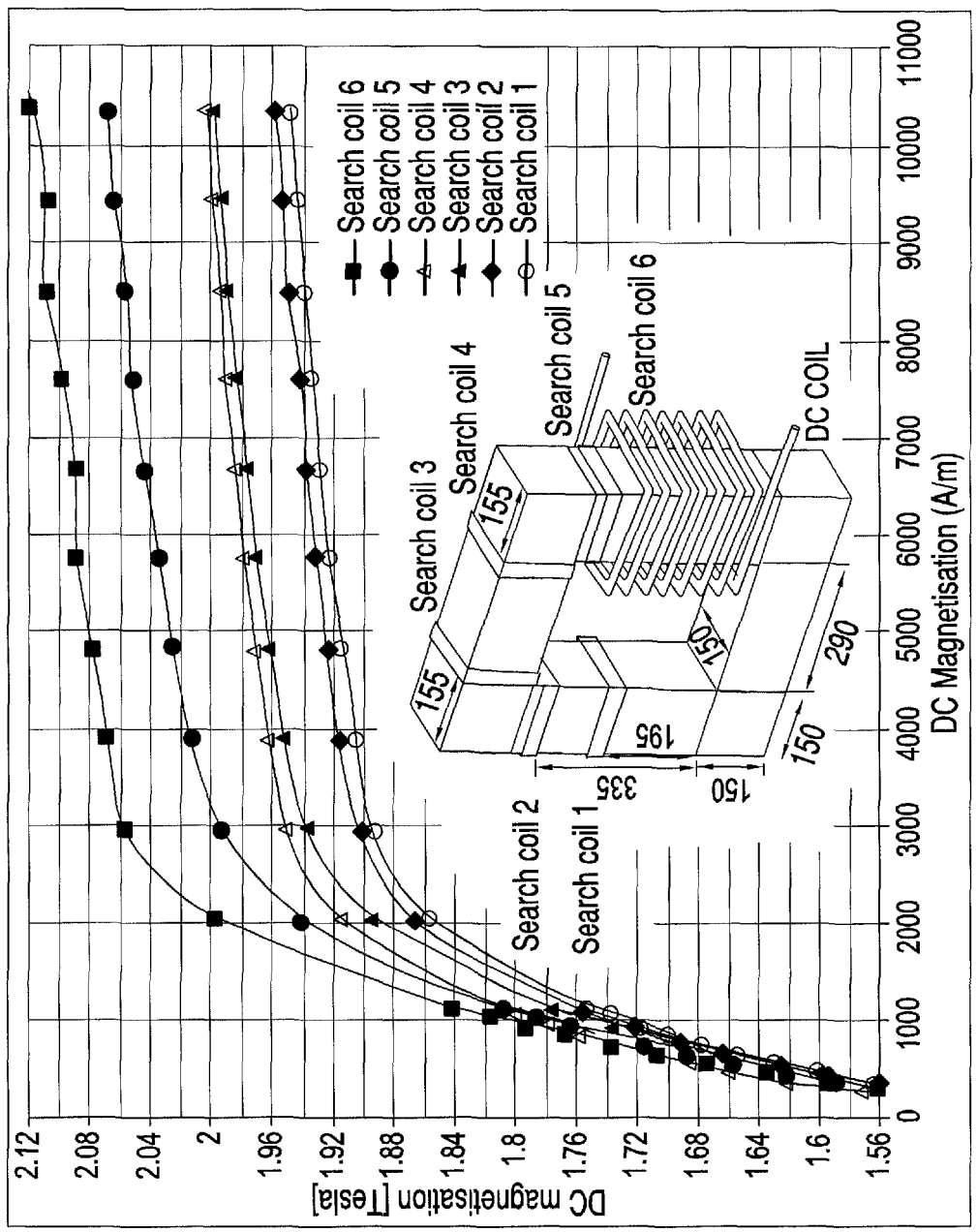
FIG. 2 illustrates the results of an FEA analysis on the structure of FIG. 1.

Other experimental details are shown in FIG. 1 and fuller results are shown in FIG. 2.

It was found that there was a loss of magnetic flux density in the far limbs and yokes. Table 1 below summarises the results for the FIG. 1 core structure at the point of maximum flux density,

TABLE 1

Basic flux density results on prototype core of FIG. 1

| Location | Search coil number employed | Flux density (T) |
| --- | --- | --- |
| Centre of inner limb | 6 | 2.12 |
| Inner limb close to DC coil | 5 | 2.07 |
| Top yoke, close to DC coil | 4 | 2.01 |
| Top yoke further from DC coil | 3 | 2.01 |
| Top of outer limb | 2 | 1.96 |
| Centre of outer limb | 1 | 1.95 |

The effect described here is well known to those skilled in the art. The reduction in AC core side flux density from 2.12 Tesla to 1.95 Tesla may not at first sight seem a disadvantage. However, it is the minor bop measurement on the AC coil which reveals the problem. While the DC side coil minor loop results in an average relative permeability of close to 1.0, as expected for a saturated core, the minor loop measured at the same level of DC coil current reveals a relative permeability of 86. This result in a high insertion impedance for the device and also reveals that the AC side core is not fully saturated despite observing the classic flattening out of the B-H curve.

The approaches to reducing flux density loss and keeping the AC side of the core saturated include:

Employing a higher cross sectional area of core throughout the frame.

Non-uniform cross sections of steel.

Reducing the total magnetic length of steel between the AC and the DC coil to make a low profile core structure.

Figure 3:
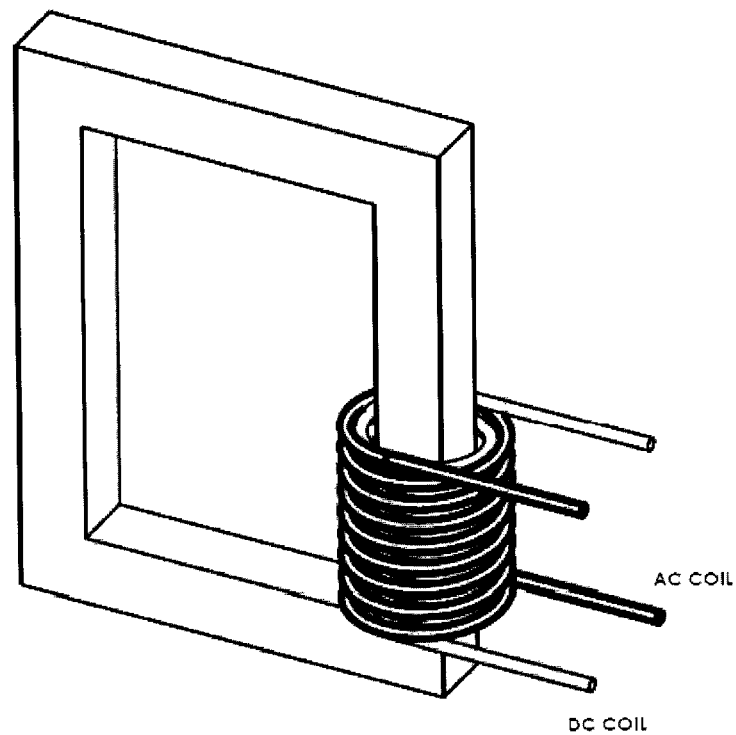
FIG. 3 illustrates a closed core structure for an FCL with the AC coil and DC coil being overlayed and coaxial—that is, the two coils are wound about the same limb of the closed core.

However, as an alternative to these approaches it is also practical to place the AC coils on the near side limbs as shown in FIG. 3.

Using this technique, the flux density in the limbs immediately underneath the AC coils is substantially the same as that immediately underneath the DC coils.

During steady state operation, the flux from the AC coils must be such that the magnetic flux density in the portion of the steel core under influence is not de-saturated or changed substantially. For this would lead to higher than the minimum possible insertion impedance and cause harmonic content in the steady state un-faulted AC waveform.

During the fault limiting activity, the flux generated from the AC coils negates that in the steel core, de-saturating a portion of the steel core, and causing the terminal impedance of the AC coil to rise.

In this particular arrangement, it will also be recognised that the outside yokes and limbs are now no longer required—only the central limbs are needed.

The problem associated with loss of flux density in the limb containing the AC coil is also associated with a higher steady state impedance in the un-faulted state, also known as the insertion impedance. The insertion impedance associated with an AC coil is directly proportional to the gradient of the flux density versus the magneto motive force (MMF) graph. If the portion of the core under the influence of the AC coil is not fully saturated to a point where this slope is minimised, then the insertion impedance will be impractically high.

Figure 4:
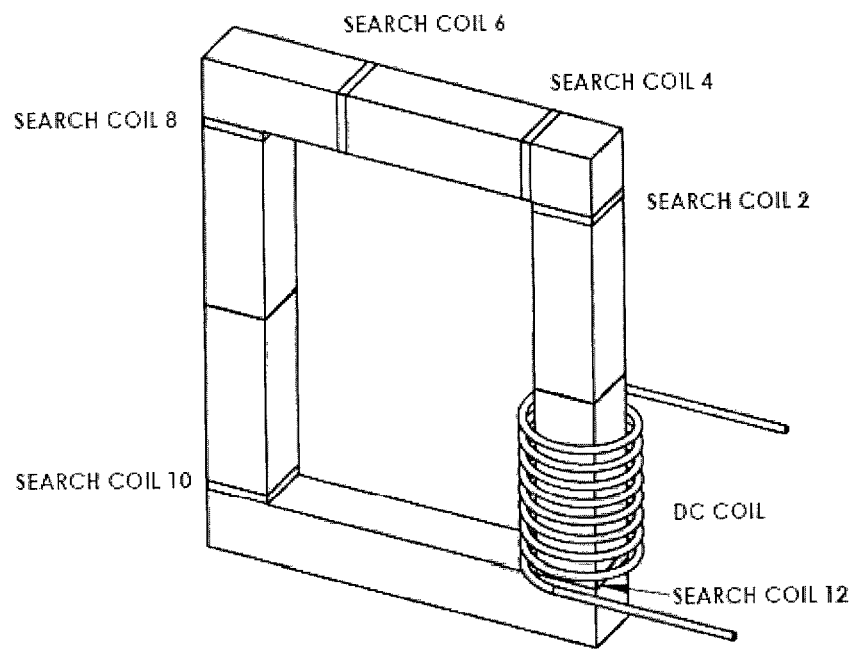
FIG. 4 illustrates an experimental closed core structure with associated search coils for allowing an investigation of the nature of insertion impedance.

To illustrate the nature of insertion impedance an experimental arrangement was constructed FIG. 4 to measure it for various locations of the AC coil on a core with respect to the DC coil. A core and coil structure was constructed with the details shown in Table 2 and Table 3 below.

TABLE 2

| | I.D. (mm) | O.D. (mm) | Height (mm) | No. of Turns | No. of Layers | Resistance (Ohms) | Wire Dia (mm) |
| --- | --- | --- | --- | --- | --- | --- | --- |
| Search Coils | | | | 15 | 25.5 | 1 | 1.70 | 0.5 |
| DC Coil | 160 | 184 | 280 | 171 | 3 | | 4.0 |
| Former (DC) | 150 | 160 | 280 | | | | |
| Core Window Internal Size | 650 (H) × 450 (W) mm | | | | | | |
| Core Section | 100 × 100 mm | | | | | | |

TABLE 3

| | |
| --- | --- |
| Iron Core Fill Factor | 0.96 |
| Intergrating flux meter employed | Walker Magnet |
| Flux Meter Settings | 25.5 × 0.96 × 100 = 2448 |
| Copper DC Coils Used (No Superconductor) | |
| All Aluminium Construction & Support - No Mild Steel Employed | |
| Search Coils Directly Wound Tightly On Core | |
| M6 Laminated Steel Core (0.35 mm thick laminations) | |

Figure 5:
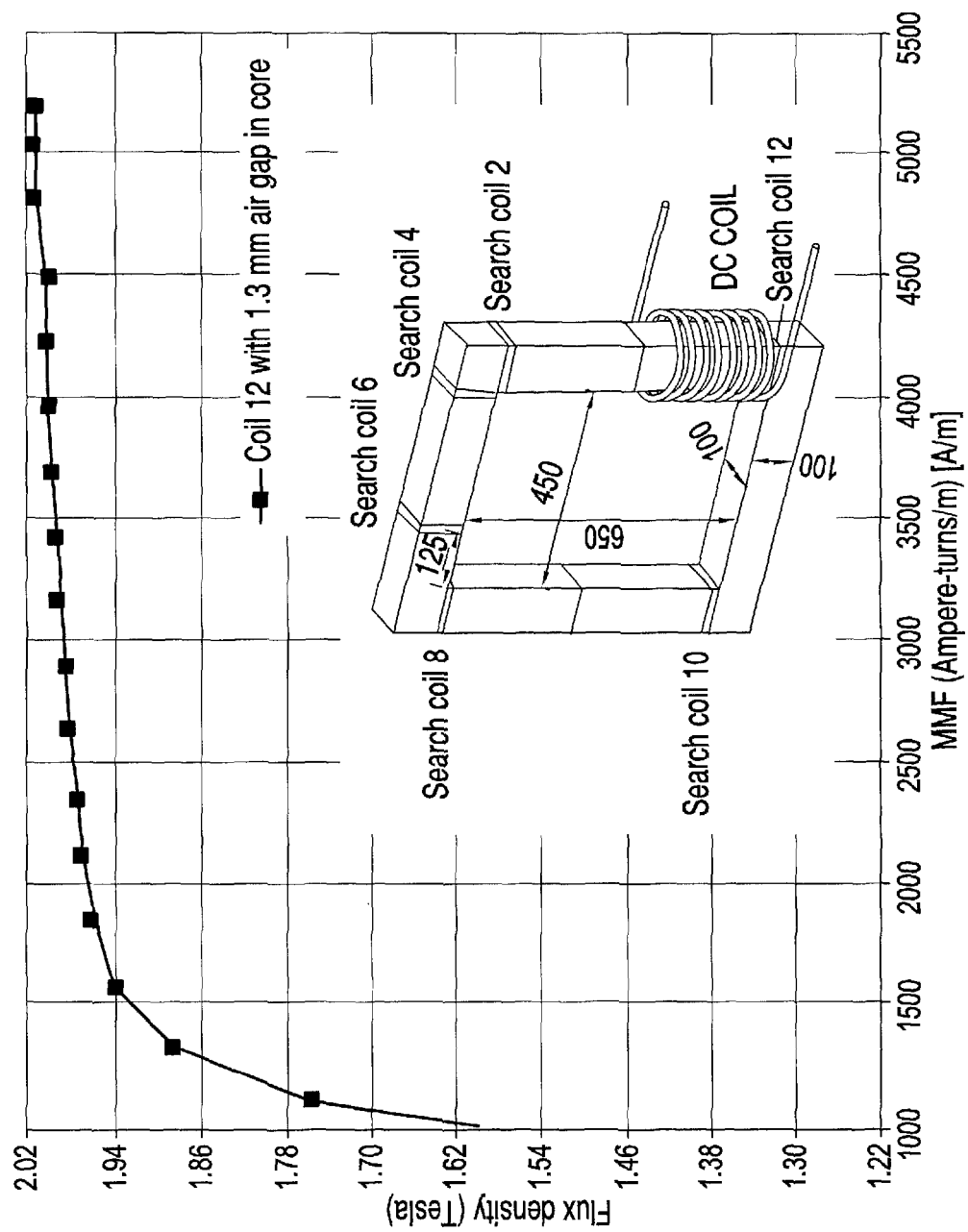
FIG. 5 is an illustration of the results of the experiment conducted with the structure of FIG. 4.

Reference is now made to FIG. 5. Confirmation of saturation on the DC side was made using search coils and hall probes. The use of Hall probes necessitated the need to introduce a 1.3 mm air gap in the core which was not employed during insertion impedance measurements.

Figure 6:
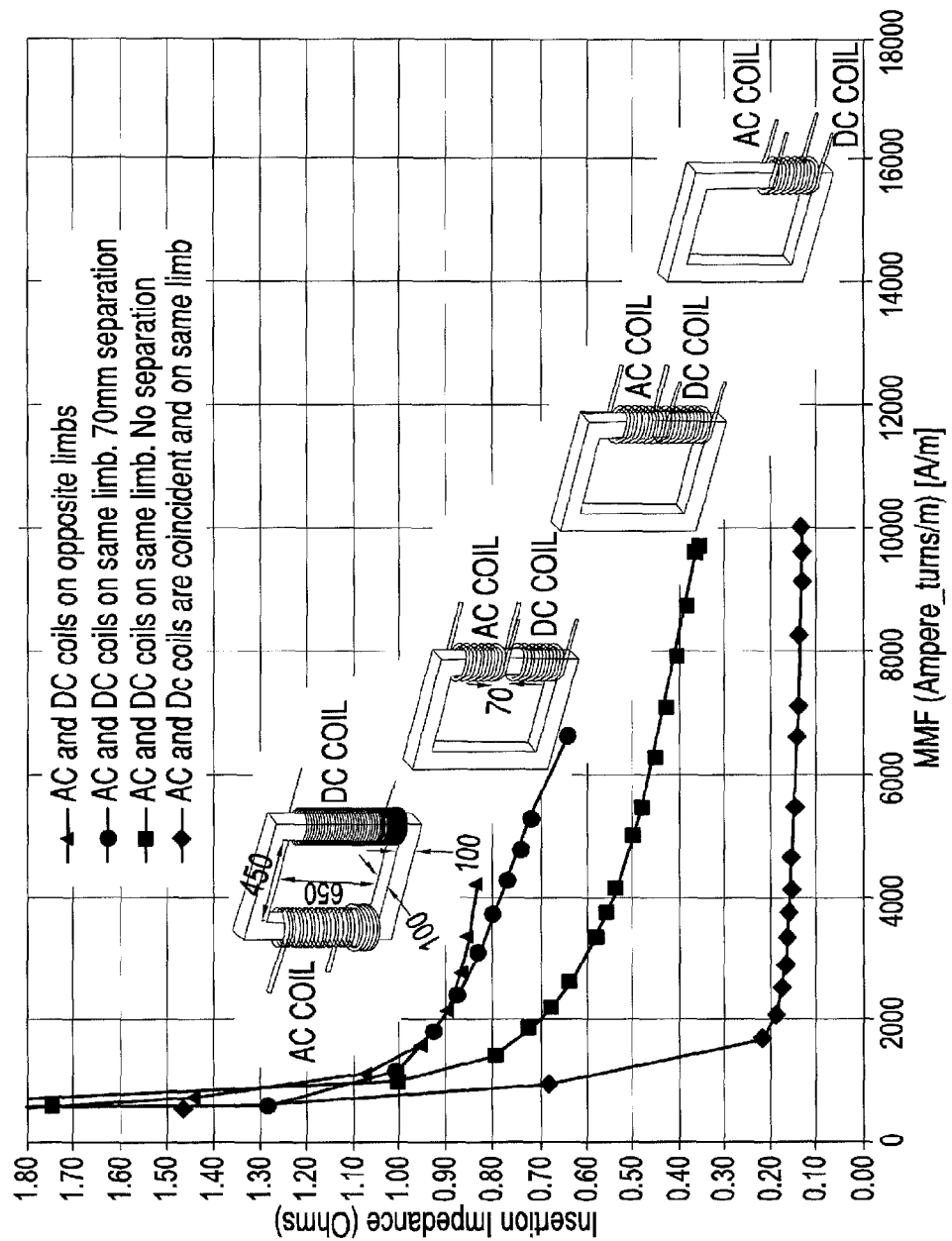
FIG. 6 summarises the measured insertion impedance results for the above experimental structures.

Other details of the experimental arrangement for the measurement of insertion impedance include:

DC current=100 Amps DC
AC voltage=50 V AC
Frequency of AC voltage and current: 50 Hz
AC current=28 Amps AC
AC turns=50
AC coil resistance=0.10 Ohms FIG. 6 summarises the measured insertion impedance results. The minimum insertion impedance is achieved with the coincident coil arrangement and with the minimum number of ampere-turns on the DC coil required for saturation. All other arrangements, including that where the AC coil is on the same limb as the DC coil and in close proximity to the DC coil, result in a higher insertion impedance.

Measurements of insertion impedance as a function of ampere-turns have confirmed that the high permeability core under the influence of the AC coil must not only be saturated but must be "super saturated" to have the theoretical minimum insertion impedance.

Figure 34:
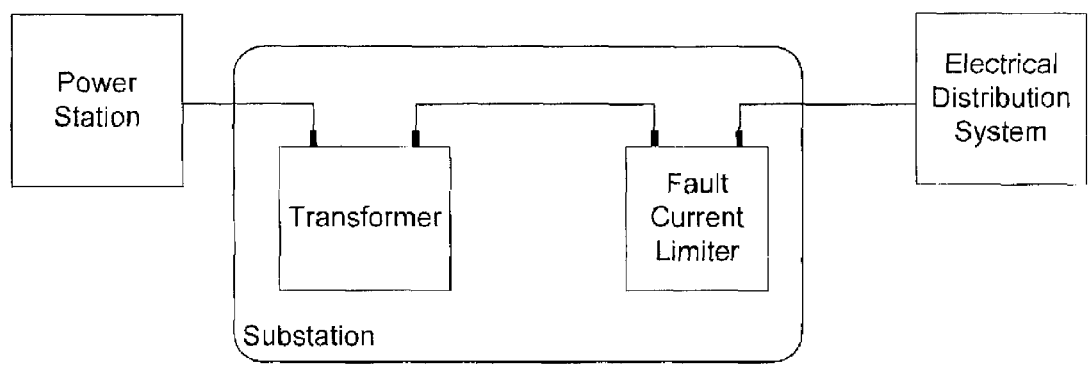
FIG. 34 is a schematic representation of an FCL in an electrical distribution system.

As shown in FIG. 34, the fault current limiter (FCL) is located in an electrical distribution substation. The FCL is primarily included to limit the fault current of a transformer, which is also illustrated. Where a substation includes more than one transformer, it is possible to have a separate FCL for each of those transformers. However, in some embodiments, less than all of the transformers within a substation have an associated FCL.

The FCL, on the downstream side, is electrically connected to an electrical distribution system of which the substation is a part.

In other embodiments, the transformer and the FCL are located within an installation other than a substation. Indicative examples include an industrial site distribution network, between a co-generator and the rest of the grid; and protecting the main electricity grid from the fault current contribution of a wind farm, wave generator, hydro-generator; or solar energy farm.

For the FIG. 34 embodiment, the power station is a coal-fired power station. However, in other embodiments, the power station is one or more of a hydro-station, a nuclear power station and a wind generator power station.

Referring to FIG. 7 there are illustrated a series of high permeability posts 1 in a three phase open core FCL arrangement in accordance with an embodiment of the invention. The Z direction is defined as being along the longitudinal direction of the high permeability core as shown. The posts are manufactured from transformer laminations, and the rolling direction of the laminations is along the Z axis.

It will be appreciated that posts 1 collectively define a core for the FCL.

The high permeability posts 1 are of transformer steel lamination material. In other embodiments, use is made of one or more of mild steel or other forms of magnetic steel ferrite materials or ferromagnetic material or granular material such as a core made from consolidated ferromagnetic powder, or a glassy amorphous core.

A DC coil 2, for the purposes of saturating a portion of the high permeability posts 1, surrounds the complete structure outside of the enclosure. The term "surrounds" or the like are used to describe how coil 2 encircles the enclosure or tank. That is, the DC coil extends about a longitudinal intermediate zone that receives the core and the AC coil. In the illustrated embodiments, the core and the AC coil or coils are disposed within a tank or other enclosure, and the DC coil encircles the enclosure. This provides for a number of packaging and performance advantages of the preferred embodiments. As will be mentioned below, the intermediate zones of the embodiments are defined by respective tanks.

A vessel 3 contains a dielectric insulation medium 4. This medium is also a cooling medium for the AC coils and may be ambient atmospheric air.

There are AC coils 5 for transporting the AC current wound on insulating formers 6 and electrically interconnected to each other in a manner such that the senses of the magnetic field produced by each AC coil in the corresponding high permeability core are opposing.

There are insulation barriers 7 between phases to improve dielectric withstand properties of the dielectric medium.

In an embodiment, the DC coil 2 is also a superconductor and more specifically it is a high temperature superconductor housed in a cryostat and cooled by a cryocooler (not shown).

Figure 8:
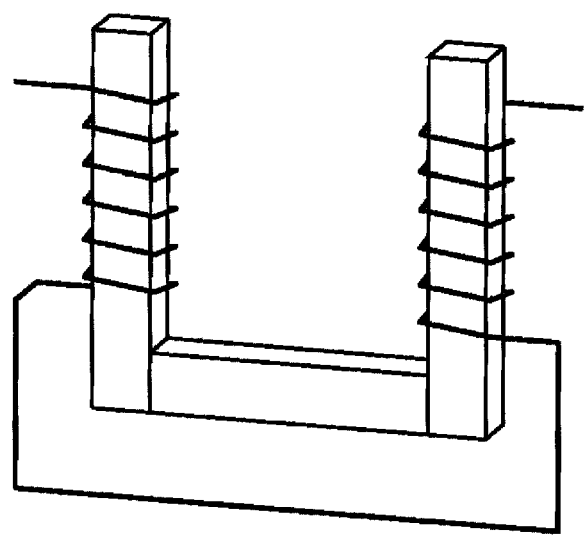
FIG. 8 is a schematic view of the electrical interconnection of the windings on two of the core posts shown in the fault current limiter of FIG. 7.

FIG. 8 shows the electrical-interconnection of two AC coils in the structure of FIG. 7 showing the sense and direction of the windings relative to each other.

By way of an example, the open core saturated FCL of a type shown in FIG. 7 was analysed by employing FEA. The DC and AC currents were stepped in order to find the optimum values of $I_{dc}$ and $I_{ac}$ a given number of turns on each of these windings and to understand the nature of the magnetisation of an open core. The parameters employed were that for a typical 15 kV class sub-station FCL and include:

Number of cores: 6
Length of a core post: 0.6 m
$A_{core}$, the cross sectional area of each core: 0.0225 m$^2$, being 150 mm×150 mm in dimension
$N_{ac}$: 50
$N_{dc}$: 500
$I_{dc}$: Stepped from zero up to 500 Amps. (Up to 250,000 DC Ampere-turns on the DC coil)
$I_{ac}$: Stepped from zero up to 1,000 Amps rms. (Up to 50,000 AC Ampere-turns on the AC coil)

The material parameters employed are that of M6 transformer laminations, and are 0.35 mm thick.

Figure 9:
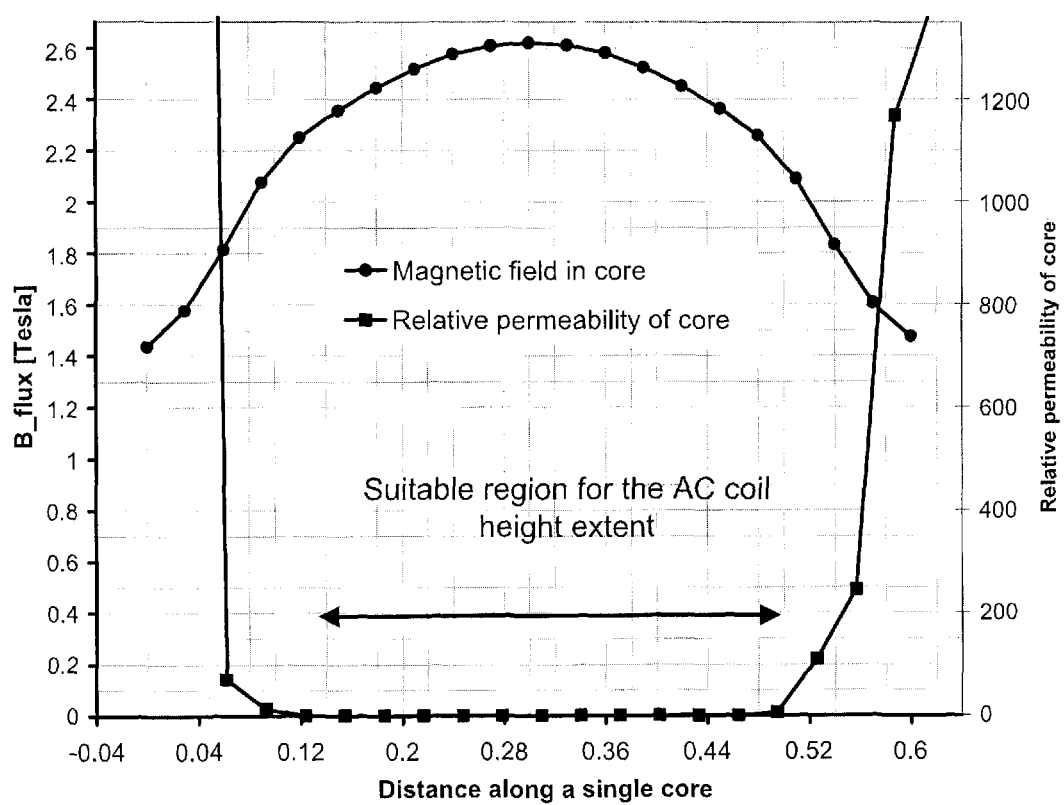
FIG. 9 shows FEA analysis results of the magnetic field and relative permeability across the length of a core in the Z direction of FIG. 7.

FIG. 9 shows the distribution of magnetic field and relative permeability across the length in the Z direction of the structure shown in FIG. 7. The region of the core suitable for placing an AC coil, the saturated region of the high permeability core, is indicated. This result shows, for example, that the AC coil should be designed such that its height is 400 mm and situated on the core not less than 100 mm from either end of the core.

Figure 10:
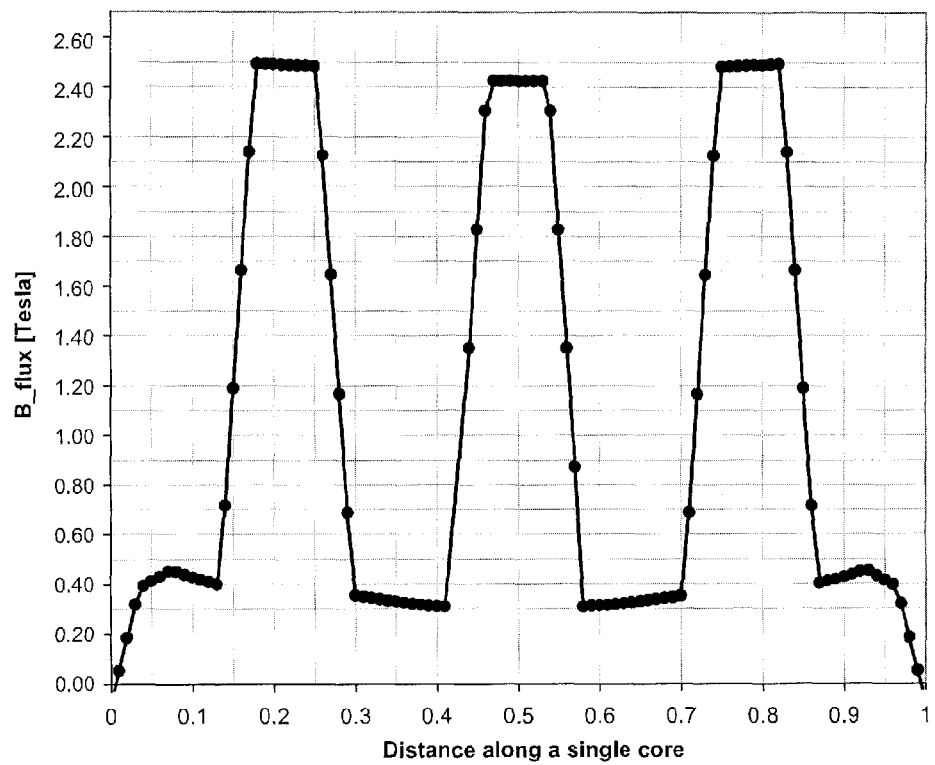
FIG. 10 shows a plot of the magnetic field along a line central to the cores and crossing three core posts in the X direction of FIG. 7.

FIG. 10 shows a plot of the magnetic field along a line passing through the centre of three cores and in the X direction. This result shows that the magnetic field in all cores is sufficient to saturate all six cores in an X-Y array of core posts despite the non uniform distance from and geometrical relationship with the DC coil winding.

Figure 11:
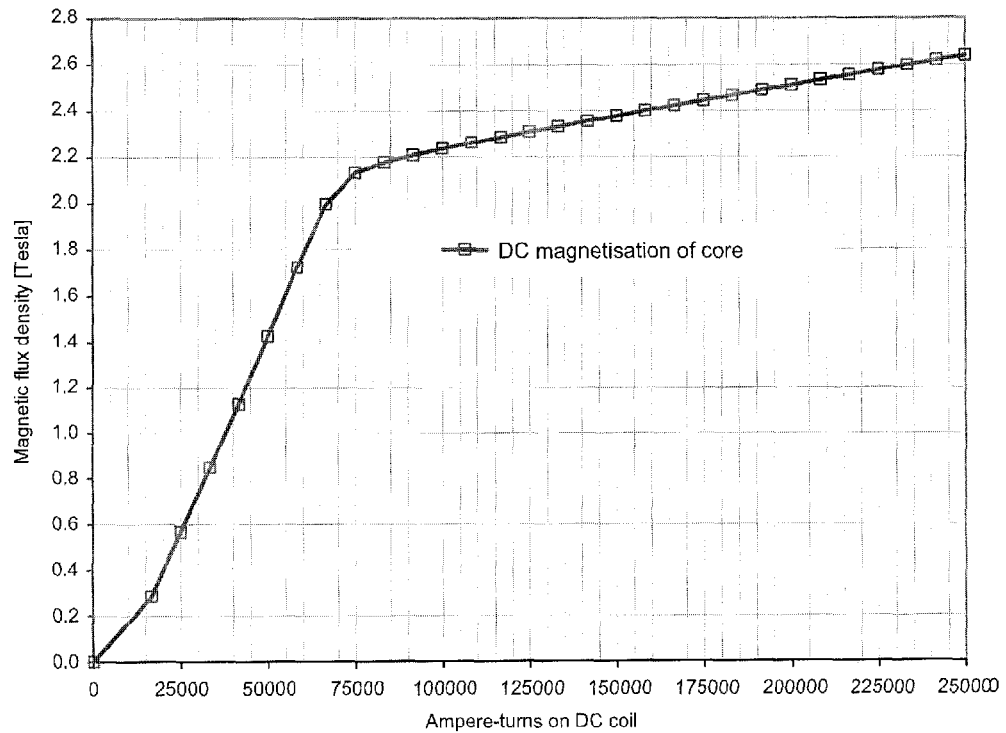
FIG. 11 shows a plot of the magnetic field in the centre of a single core post of FIG. 7 with DC current energisation.

FIG. 11 shows the DC magnetisation ($I_{ac}$=0) of the core in the central region of the core indicted in FIG. 9.

Figure 12:
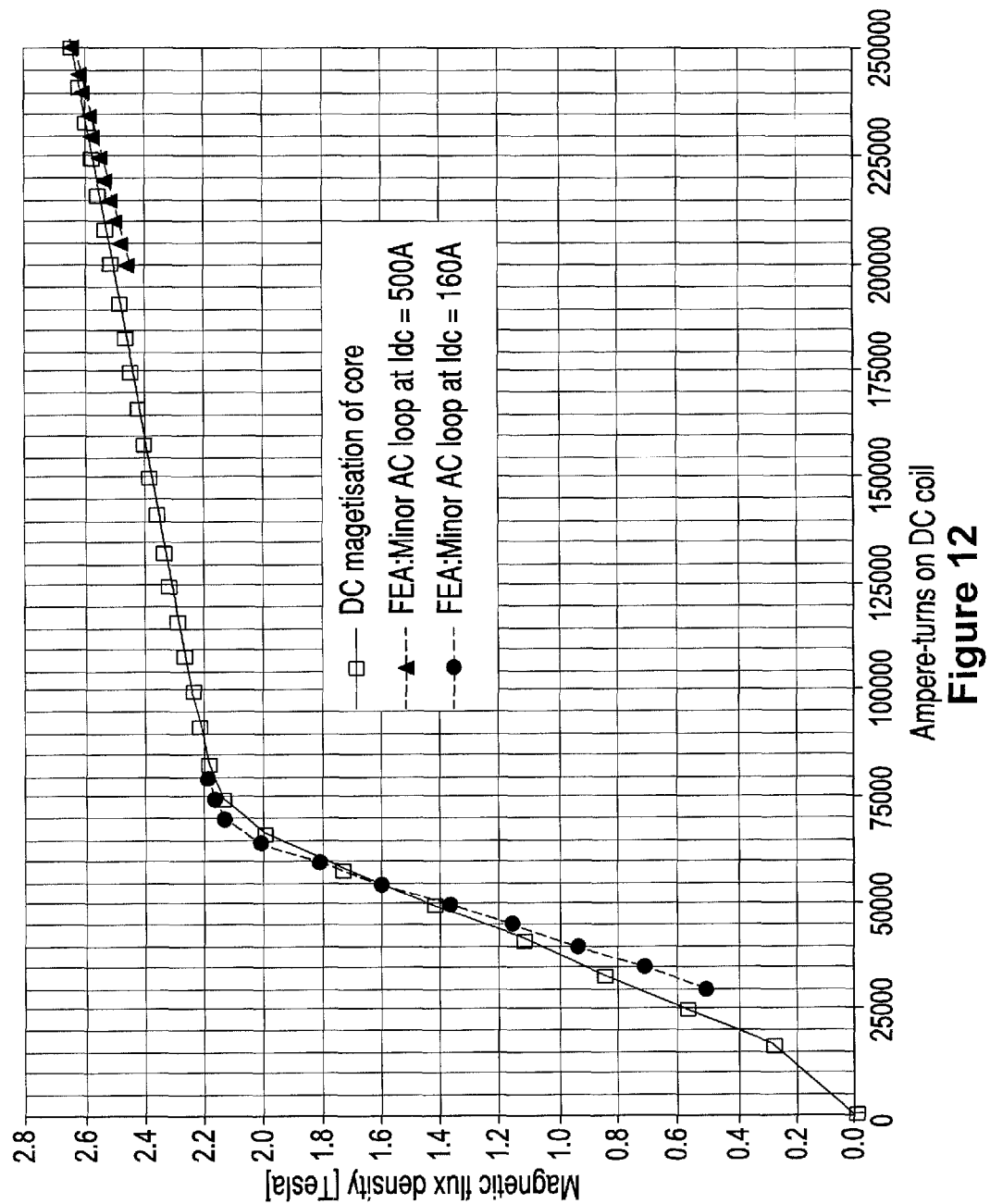
FIG. 12 shows a plot of the DC magnetisation of the core of FIG. 7 with DC minor excursions about two otherwise saturated operating points.

FIG. 12 Shows the Minor AC magnetisation excursion curve of the central portion of the core at two different DC bias current values.

From a consideration of FIG. 11 alone one may draw the conclusion that a DC coil energisation of 80,000 DC ampere-turns (Equivalent to a DC current of 160 Amps on the DC coil of 500 turns) would be sufficient to saturate the core. However, a consideration of the AC coil minor magnetisation curves (FIG. 12) and the relative permeability of the core under AC coil energisation (FIG. 13) shows that at least 140,000 DC coil ampere-turns (that is, at least 280 Amps DC on the DC coil) is required for the core to have low relative permeability and therefore bestow low insertion impedance on the AC coil.

FIG. 12 shows that an AC current of up to 1,000 Amps on the AC coil would de-saturate the core with a DC operating current as low as 160 A (80,000 ampere-turns). This is undesirable and such a design would lead to a high insertion impedance, high THD, and a distorted current waveform. By comparison, the minor DC magnetisation loop calculation at an operating point of 500 A is also shown which is a more desirable operating point. Under these conditions the core is super-saturated under the AC coil and is a more suitable operating point.

Figure 14:
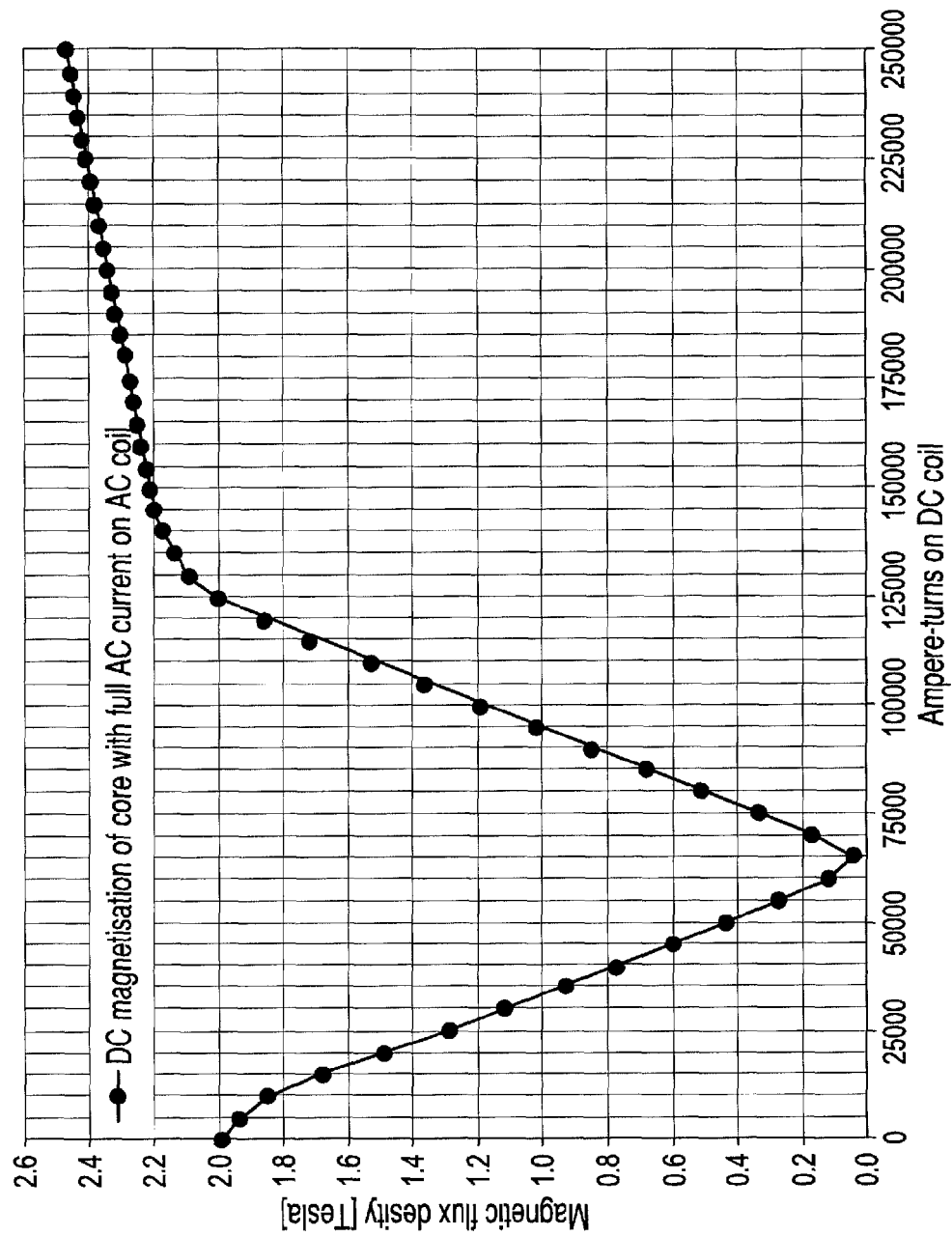
FIG. 14 shows a plot of the DC magnetisation of the core of FIG. 7 as a function of the DC ampere-turns with the full AC current on the AC coil such that the fluxes produced by each are opposing.

In general, when considering the complete list of optimisation variables, the combined calculations of DC magnetisation and minor DC magnetisation is not a straight forward approach to finding suitable DC operating Ampere-turns and requires a lengthy FEA optimisation process. To simplify the process, the inventor proposes a static magnetisation analysis of the core with the AC coil energised to the peak of the current waveform under maximum loading. FIG. 14 shows such an FEA calculation from which it is clear that in this case a DC magnetisation of 150,000 Ampere-turns are required for the core to remain in saturation at each and every instantaneous point of the AC current waveform.

It is important practically for a fault current limiter to have a low insertion impedance. In the present embodiment this is achieved by ensuring that the volume of the steel core under the direct magnetic influence by the AC coil is fully saturated by the DC coil to a level, $B_{sat}$, such that it remains saturated in the normal AC steady state operating condition.

The saturable core FCL design shown in FIG. 7 meets the four main criteria for a FCL and has the advantages of:

Lower mass through the absence of the yokes and outer limbs.

Lower footprint for a given fault current and steady state rating.

Economic cost of construction.

By inverting the relative locations of the AC and DC coil, the following technical benefits are also obtained:

The structure becomes directly amenable to high voltage and extra-high voltage designs without requiring special dielectric feed-throughs or vacuum-to-dielectric interfaces. The central part of the high permeability core may be immersed in liquid or gaseous dielectric fluid in much the same way that a power transformer is completely immersed in dielectric fluid.

Aspects of the technology and body of knowledge about high voltage transformer design with synthetic silicon oil or other dielectrics are applicable to this basic design including gaseous high voltage dielectrics such as $SF_6$. This reduces a substantial risk involved in the design and development process for high voltage versions of these devices.

Standard well-known solid materials used for immersion in liquid dielectrics and employed at high static voltages may be employed.

The AC phase coils envelope an area of the steel limbs which is super saturated.

Figure 13:
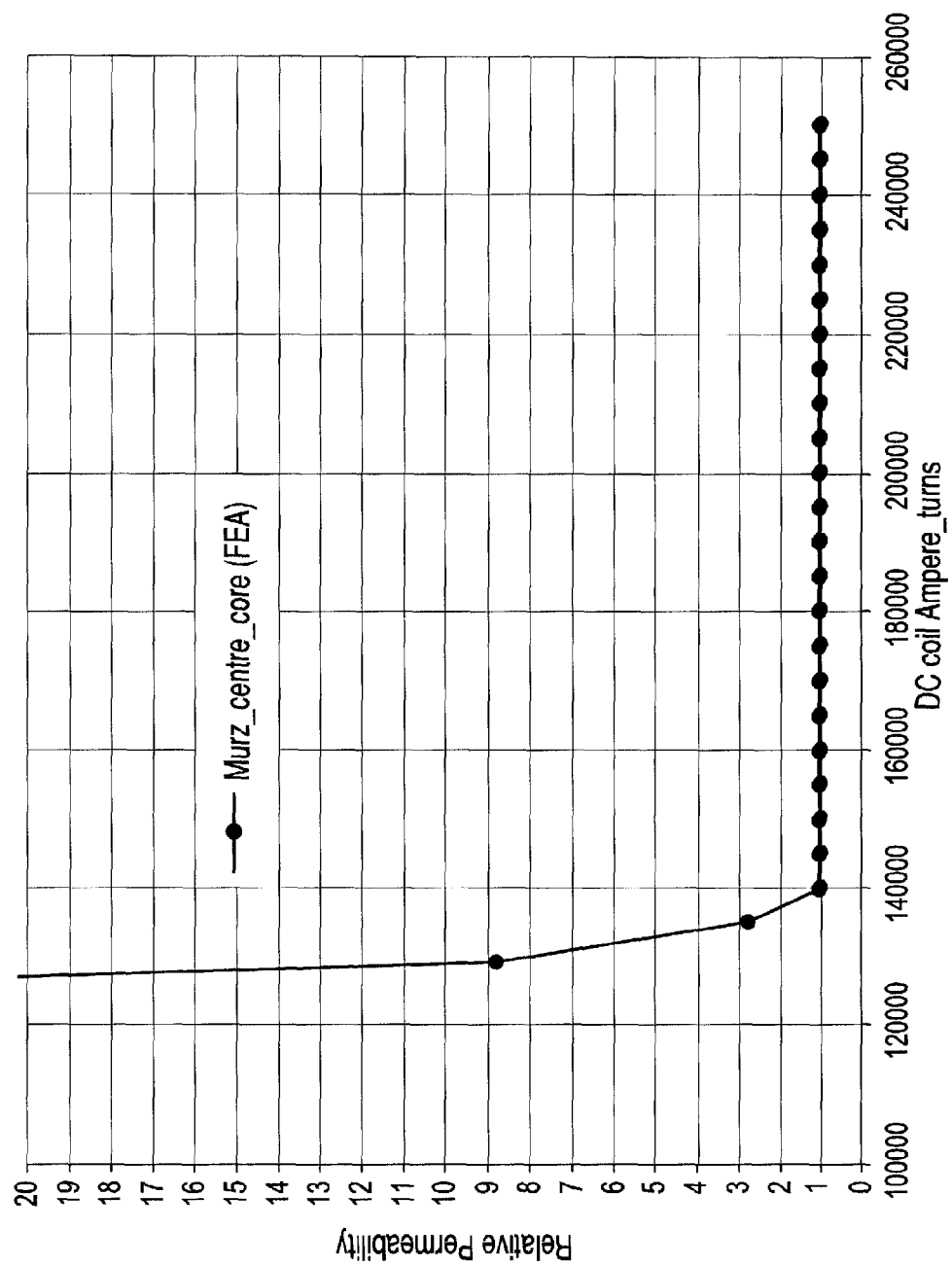
FIG. 13 shows a plot of the relative permeability at the middle of a core post of FIG. 7 with respect to DC coil energisation and with 1,000 amps of current in the 50 turn AC coil.

The extent of electromagnetic influence of the AC coils are such that the insertion impedance is very close the theoretical minimum that it can be. For example, as illustrated in FIG. 9 and FIG. 13. In these figures the FEA has revealed that the relative permeability of the cores is very close to unity despite the non-uniform distance from the race track DC coil.

In another embodiment, the open cores are tapered to the ends in a manner which keeps all of the core saturated.

Figure 15:
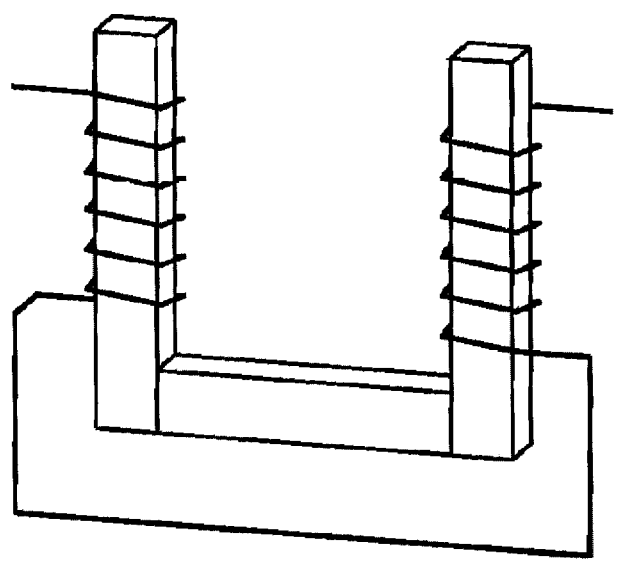
FIG. 15 is an alternative form of the invention showing the same winding interconnection and that the bottom yoke between two cores is retained.
Figure 16:
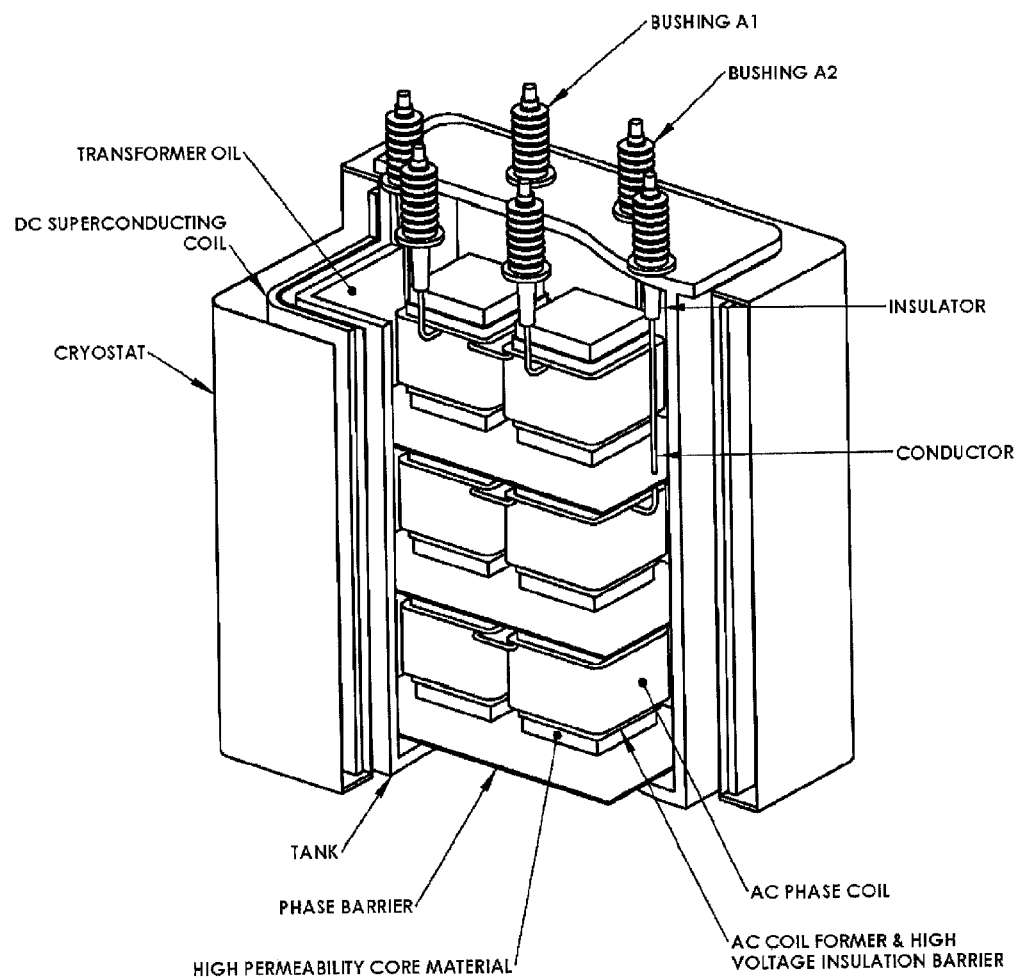
FIG. 16 shows an arrangement of a three phase open core FCL design with three rows and two columns of steel cores and with electrical interconnections on each phase according to that detailed in FIG. 8.
Figure 17:
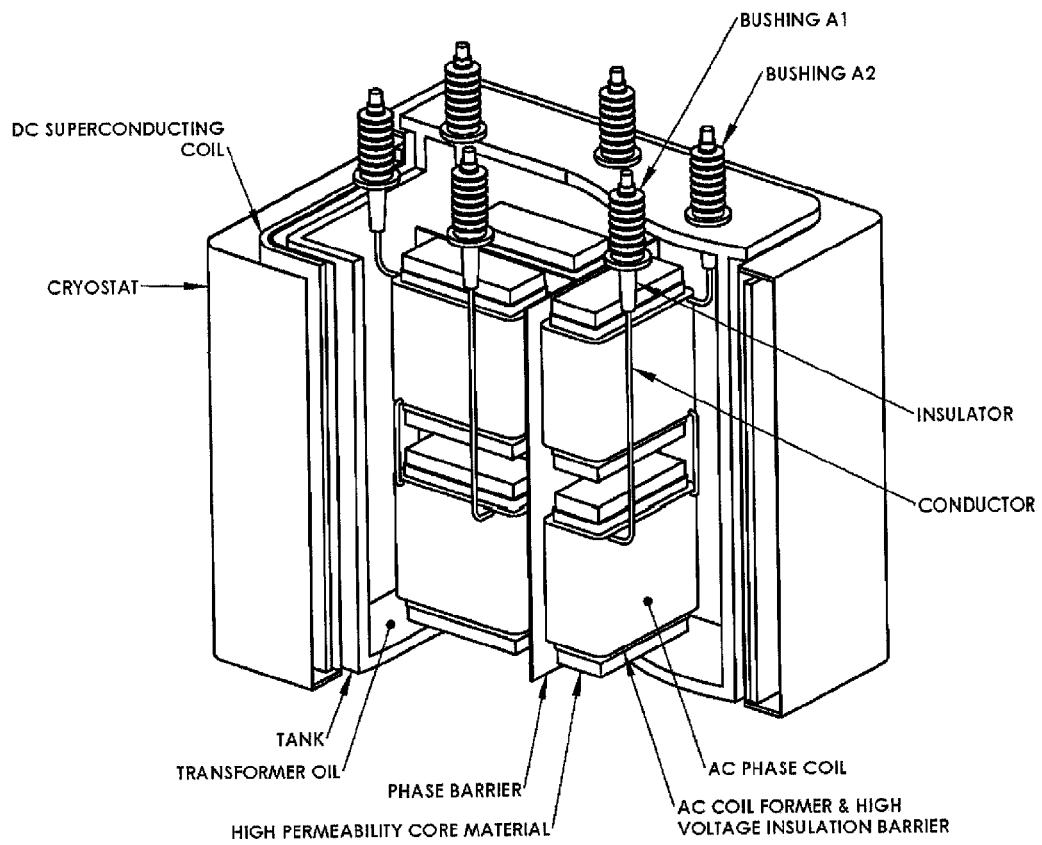
FIG. 17 shows an alternative arrangement of the three phase open core FCL design with two rows and three columns of steel cores and with electrical interconnections on each phase according to that detailed in FIG. 8.
Figure 18:
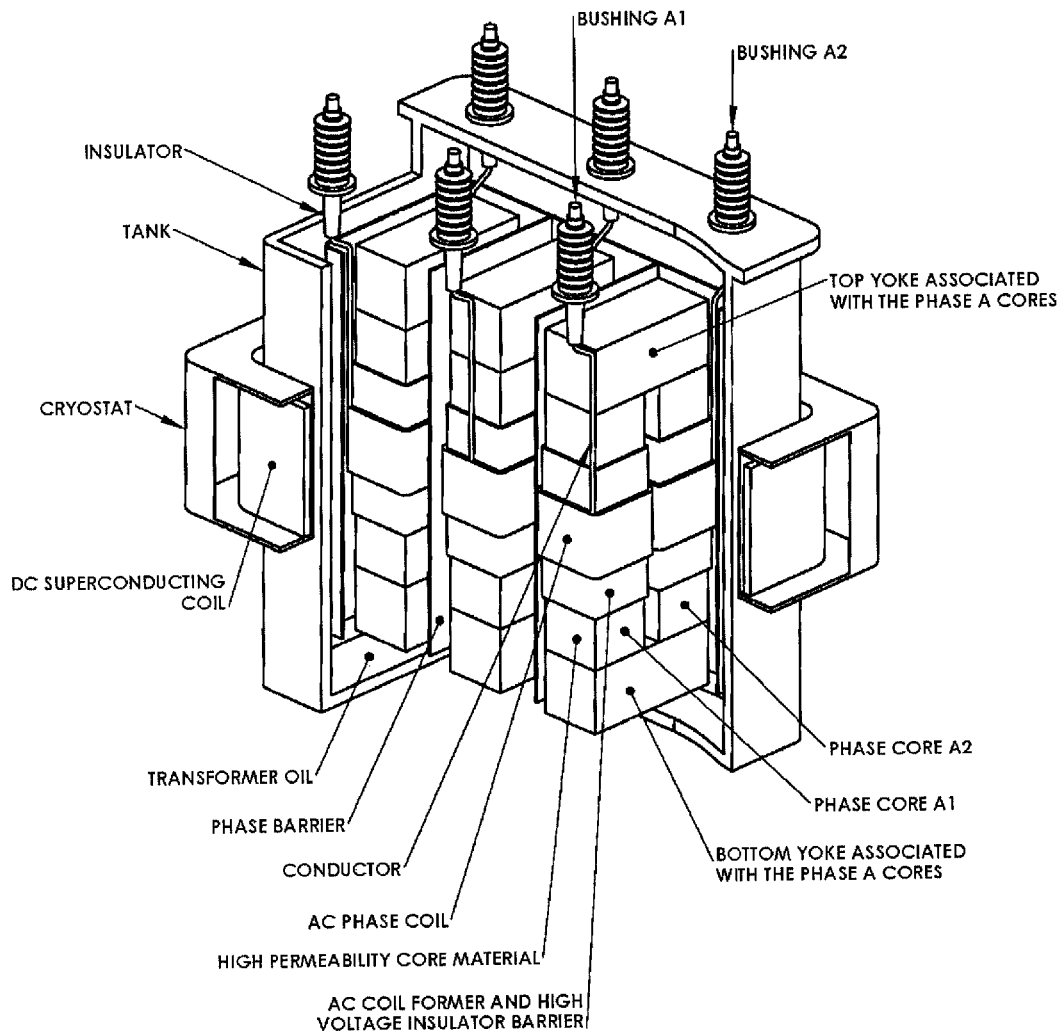
FIG. 18 shows a yoked alternative of the three phase open core FCL and with electrical interconnections on each phase according to that detailed in FIG. 8.

In the further embodiment shown in FIG. 15 the core posts of each phase are connected with a yoke but remain open at one end.

Figure 19:
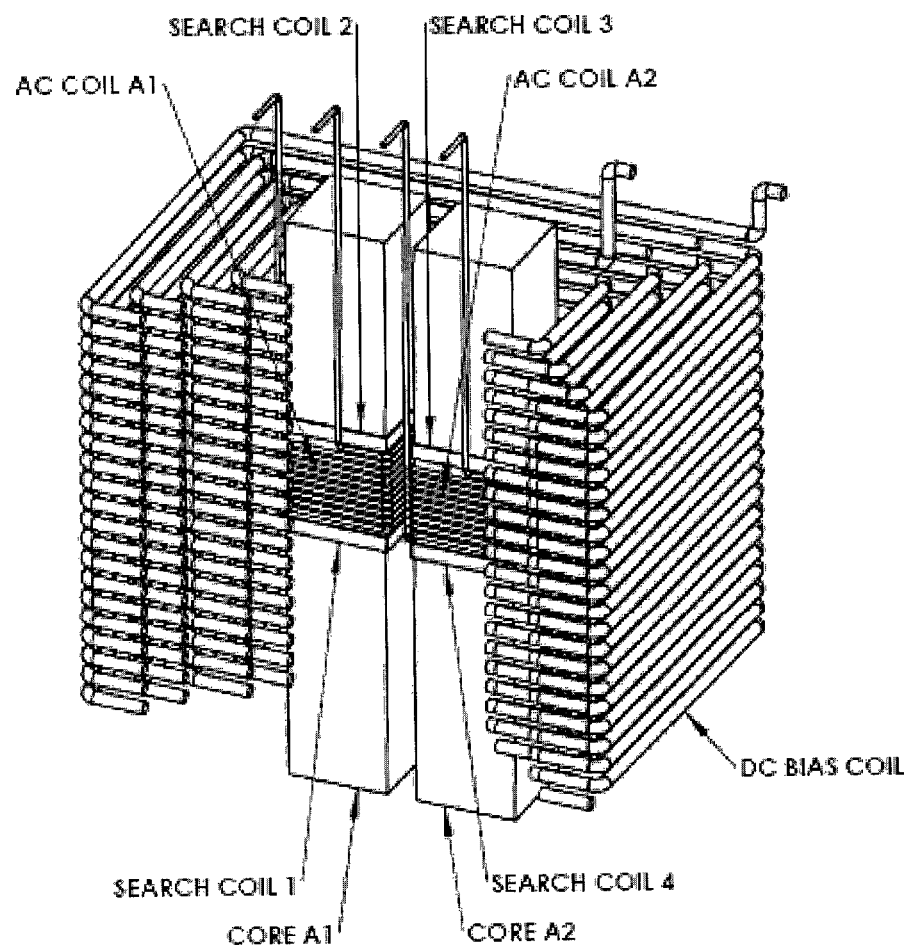
FIG. 19 shows the experimental arrangement employed for flux density and AC steady state un-faulted insertion impedance measurements and fault current limiting characterisation and with electrical interconnections on each phase according to that detailed in FIG. 8.

FIG. 19 shows a FCL having a single phase open core with the following details:
Core dimensions: 100 mm×100 mm×570 mm
Number of turns on each AC coil core: 20
Number of turns on DC biasing coil: 100

Figure 20:
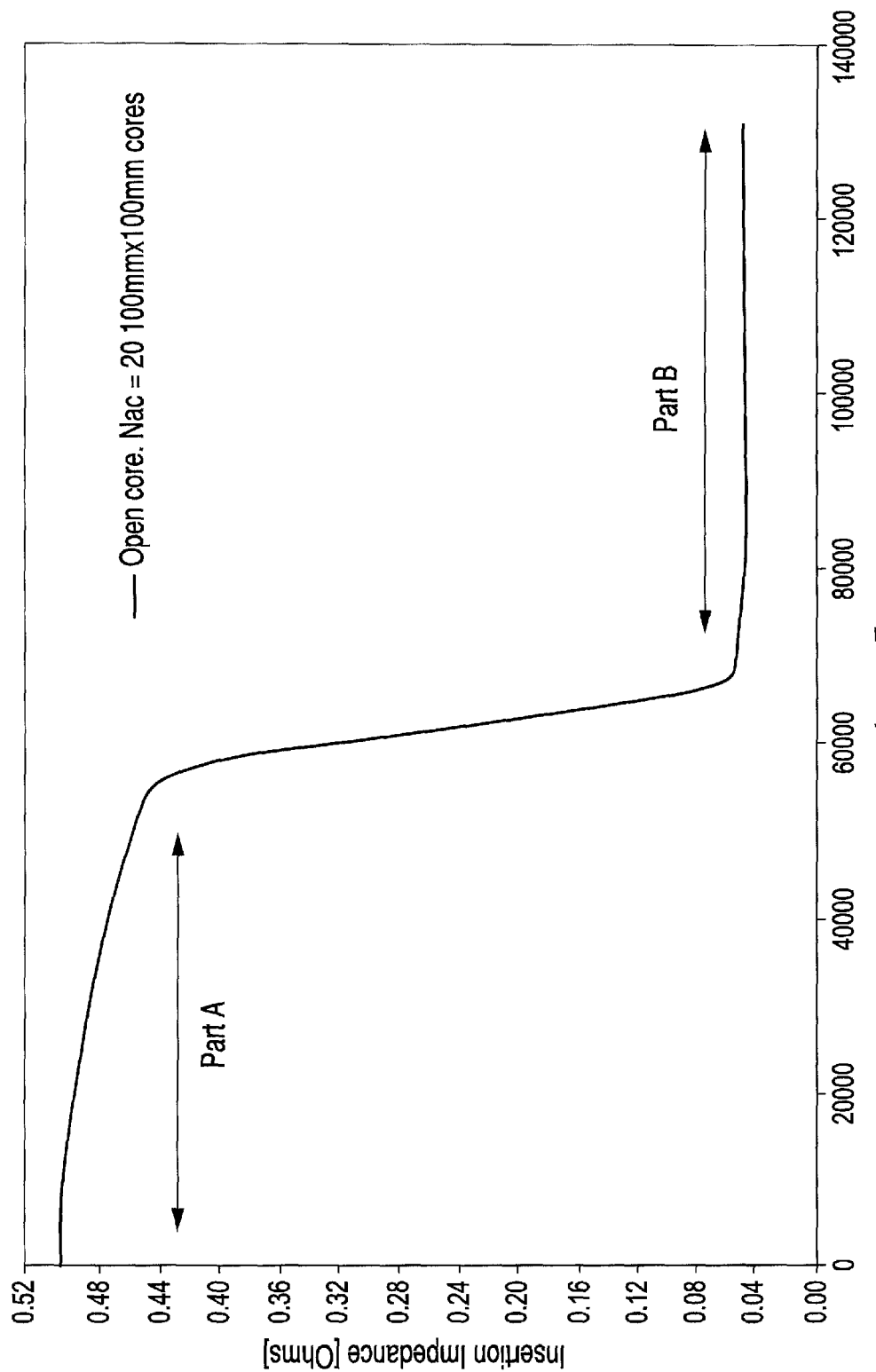
FIG. 20 shows the measured un-faulted insertion impedance characteristics for the open core FCL experimental arrangement.

The results from the experimental arrangement shown in FIG. 19 are given in FIGS. 20 to 26. More particularly, FIG. 20 shows the measured steady state un-faulted insertion impedance at 50 Hz across the open core FCL terminals. There is distinct change in the characteristic of the insertion impedance when sufficient DC bias is applied. In part A of FIG. 20, below the minimum insertion impedance, the magnetic saturation of the high permeability core has not yet reached the complete volume of the core under the magnetic influence of the AC coil. Hence, the measured insertion impedance is high.

In part B of FIG. 20 the magnetic saturation of the high permeability core has reached the extent of the AC coil's influence. This shows that a region of the high permeability core equal to at least the height of AC coil must be saturated by the DC coil in order to obtain the minimum insertion impedance for the open core design.

Figure 21:
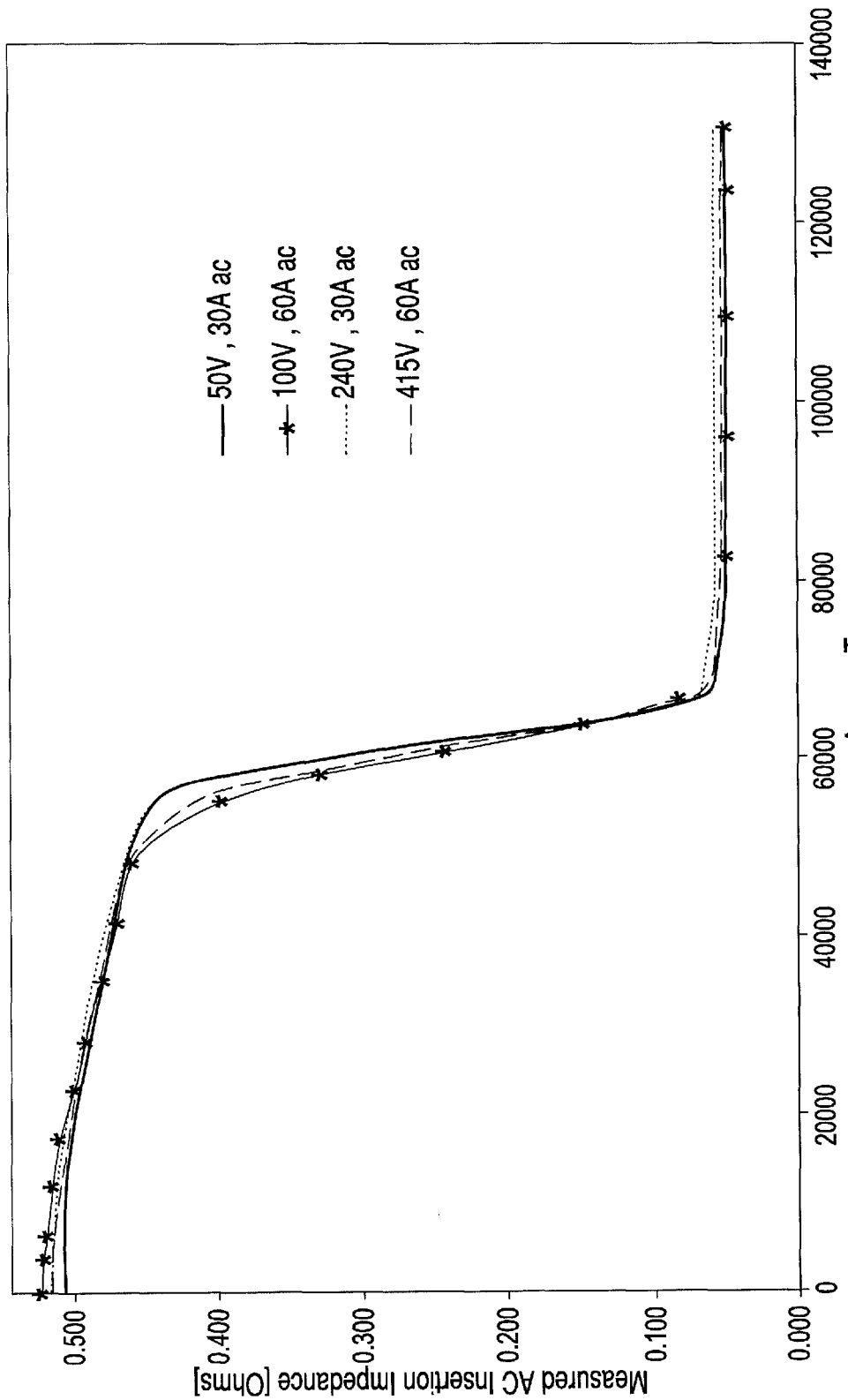
FIG. 21 shows the un-faulted steady state insertion impedance characteristics at different AC voltages and currents.

FIG. 21 shows the un-faulted steady state insertion impedance characteristics of the open core FCL for a number of different voltage and current levels and shows that this quantity is independent of the AC voltage level and current level.

Figure 22:
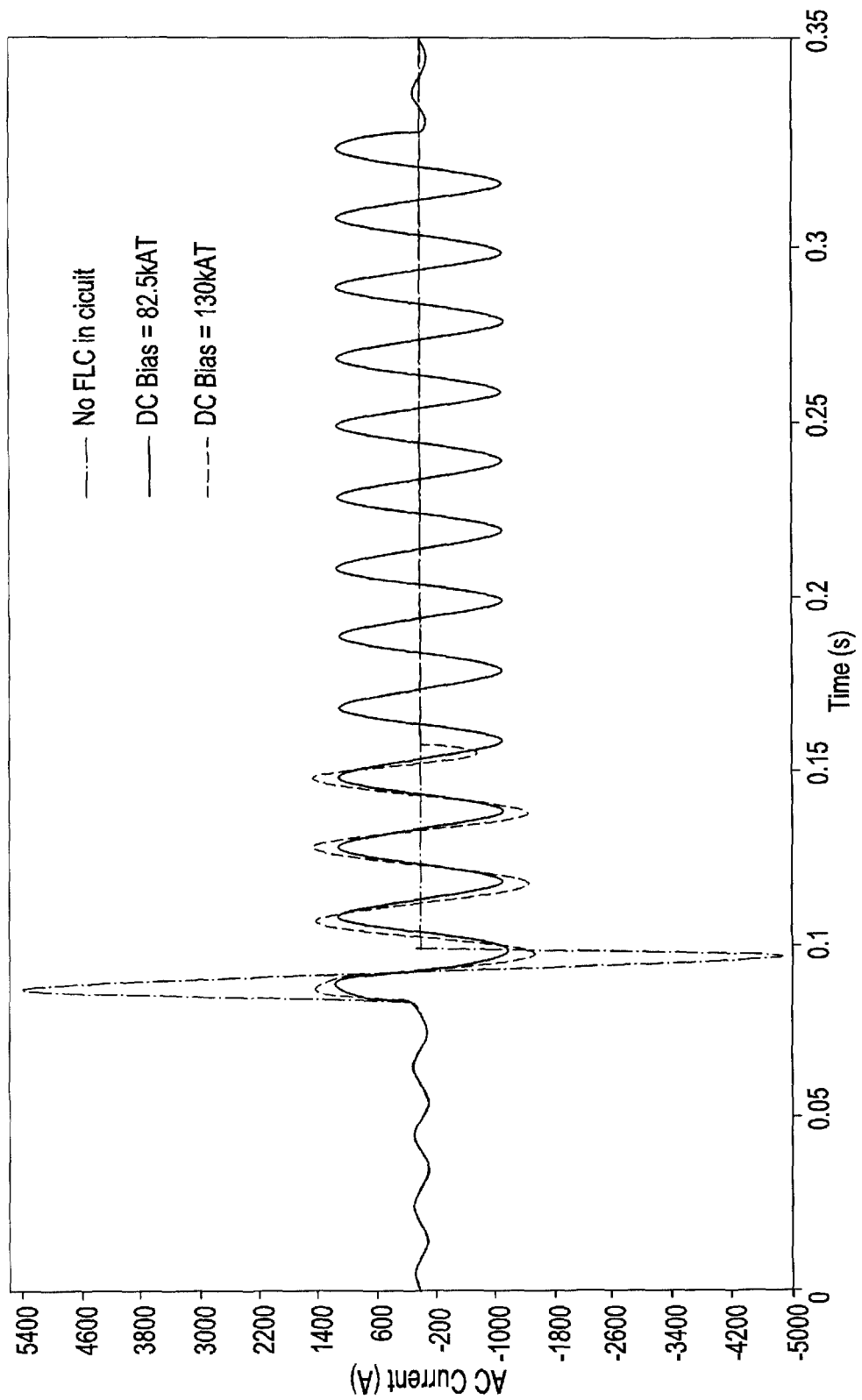
FIG. 22 shows Fault current characterisation plots for an open core FCL as a function of the DC bias.

The transient AC current plots in FIG. 22 display the difference in the fault current with and without the FCL placed in the measurement circuit. This data shows that significant reductions in fault current are possible for the open core FCL arrangement.

Figure 23:
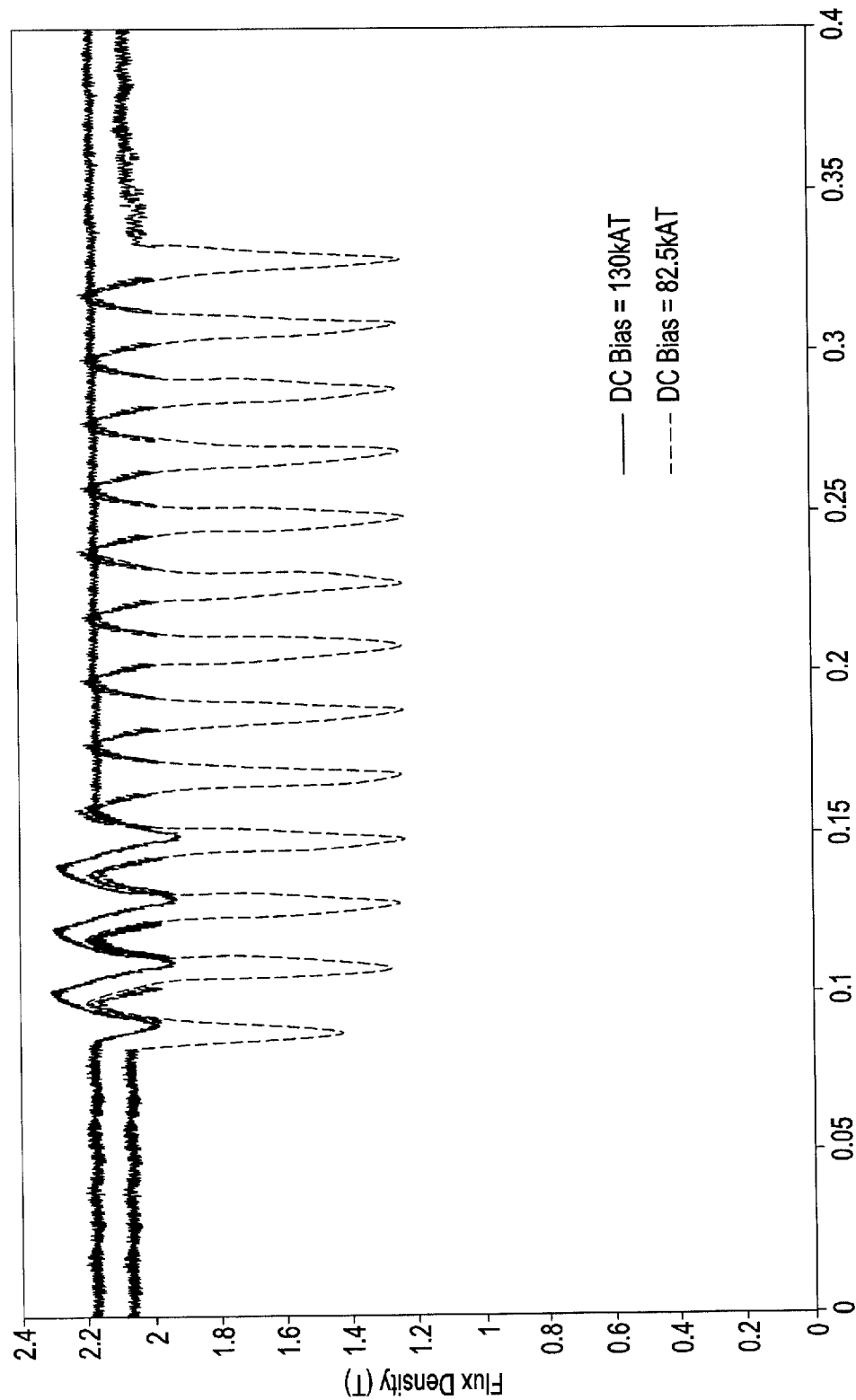
FIG. 23 shows the Flux density transient characterisation plots of the open core experimental arrangement.

FIG. 23 shows the measured flux density in the steel core as a function of time during the fault current event. The fault current effectively de-saturates the steel core region under AC coils. This results in the FCL having a high impedance during the fault and hence effective, intrinsic fault current limiting properties.

Figure 24:
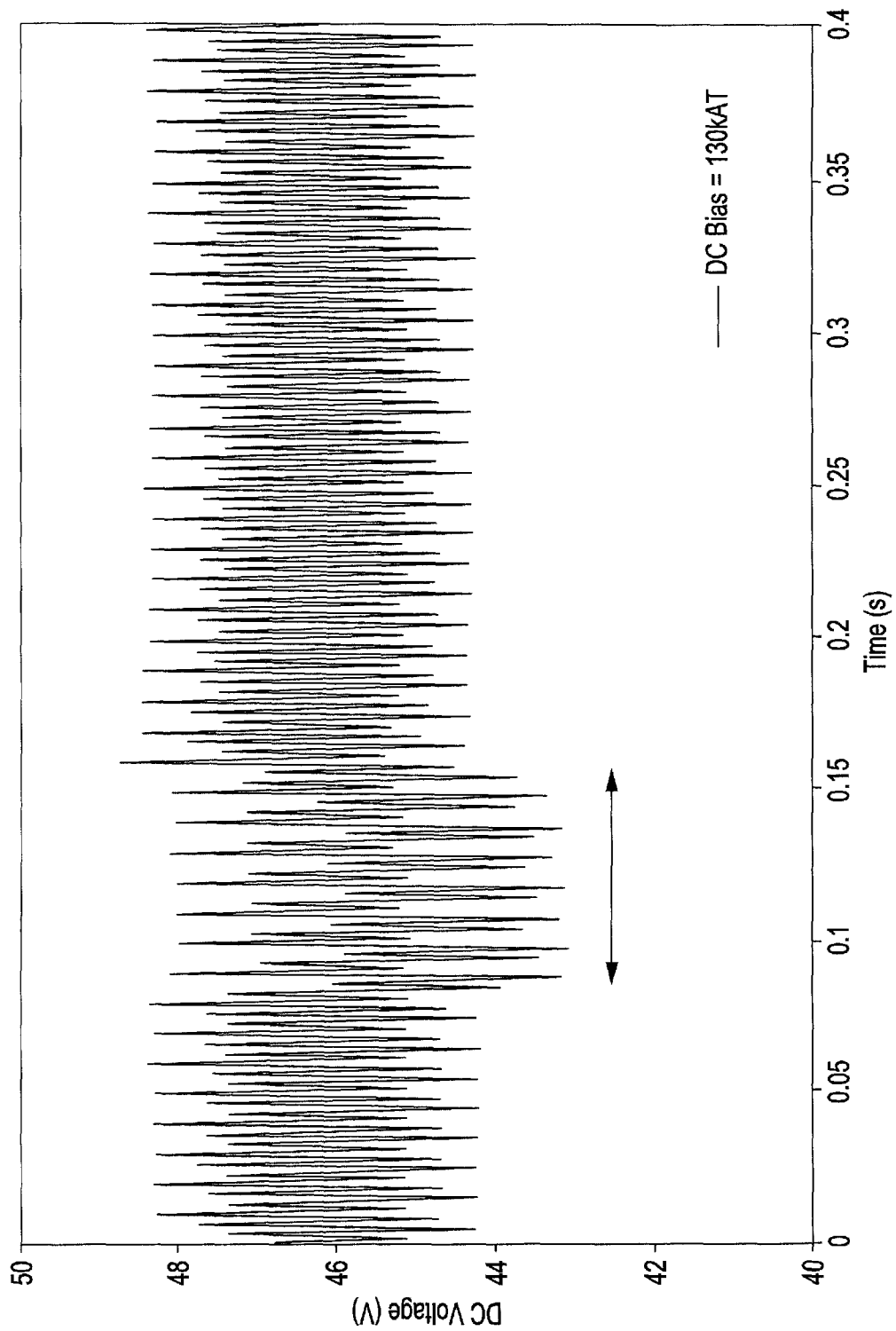
FIG. 24 shows a plot of DC circuit transient voltage when the core is saturated to an extent beyond the AC coil's region of influence, and where the presence of the fault is detected as a slight drop in voltage between arrow points starting from t=0.08 seconds.

The data shown in FIG. 24 indicates that if the high permeability core is sufficiently saturated that the transient voltage induced into the DC coil remains manageable and not unduly deleterious during the fault. This is analogous to the classic saturated FCL core design.

Figure 25:
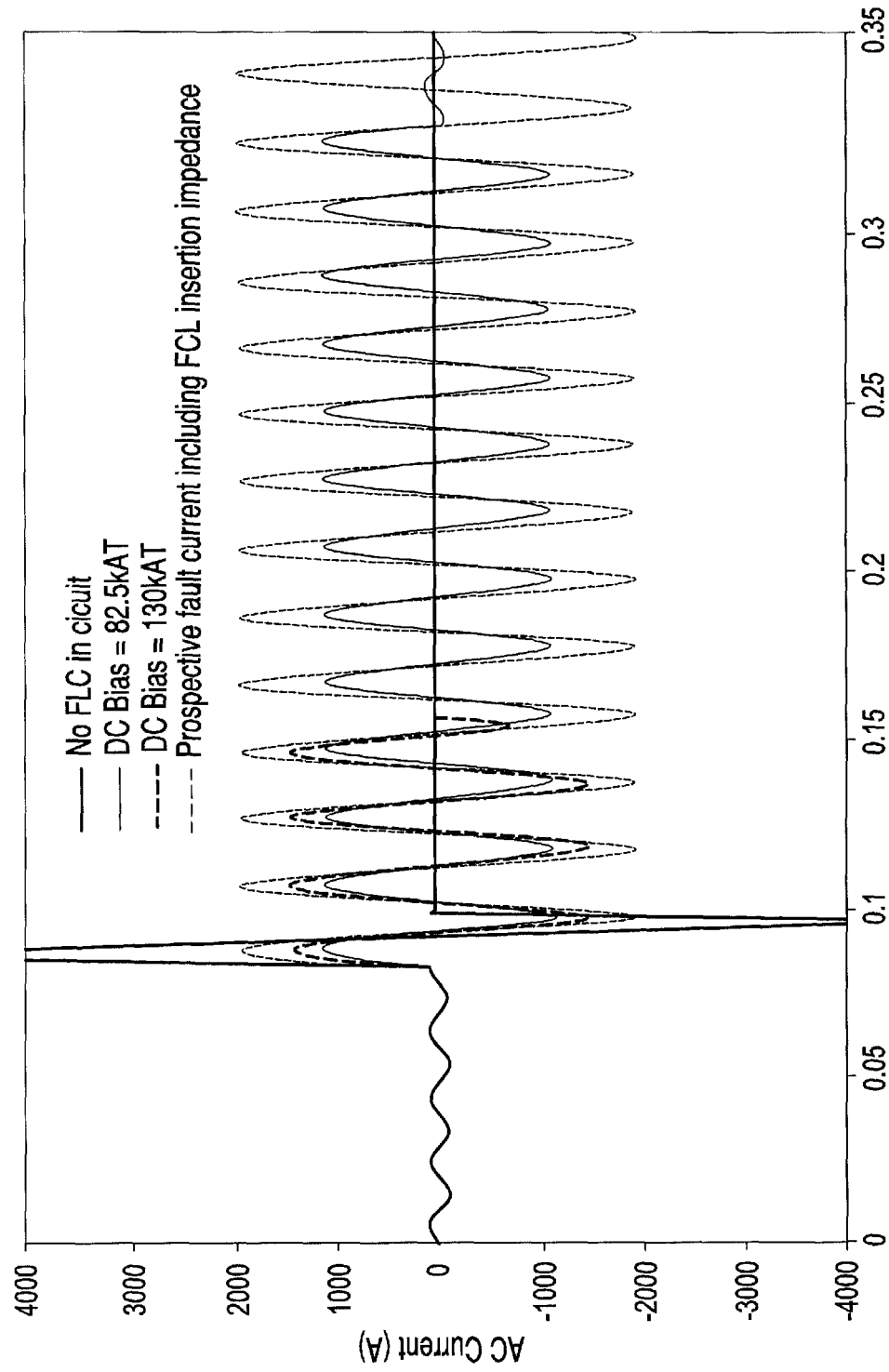
FIG. 25 shows the transient fault current plots of the experimental arrangement with and without the open core FCL in circuit.

FIG. 25 shows the measured transient fault current waveforms with the calculated prospective fault current after allowing for the AC coil resistance and the steady state un-faulted inductive component of the FCL AC coil impedance. The additional reduction in fault current from a peak of 2,000 Amps to a peak of 1,100 Amps is due to the additional change in magnetisation after allowance for AC coil resistance and the steady state un-faulted insertion impedance.

Figure 26:
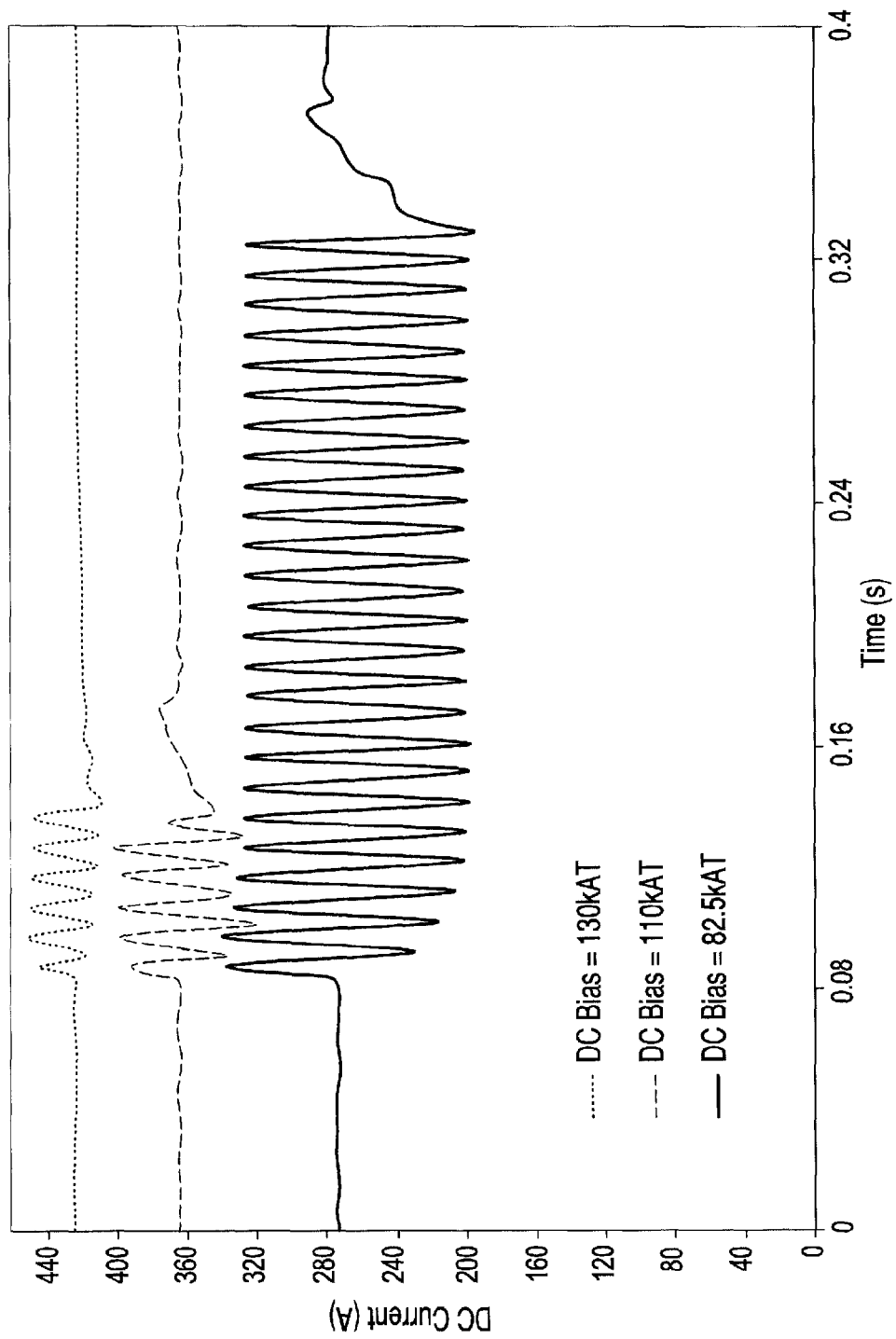
FIG. 26 shows the DC circuit transient current characteristics of the open core FCL experimental arrangement.

FIG. 26 shows the measured DC current transients during the fault event at a number of different DC bias current values. The inducted transient DC current is insignificant if the steel core is sufficiently biased.

Figure 27:
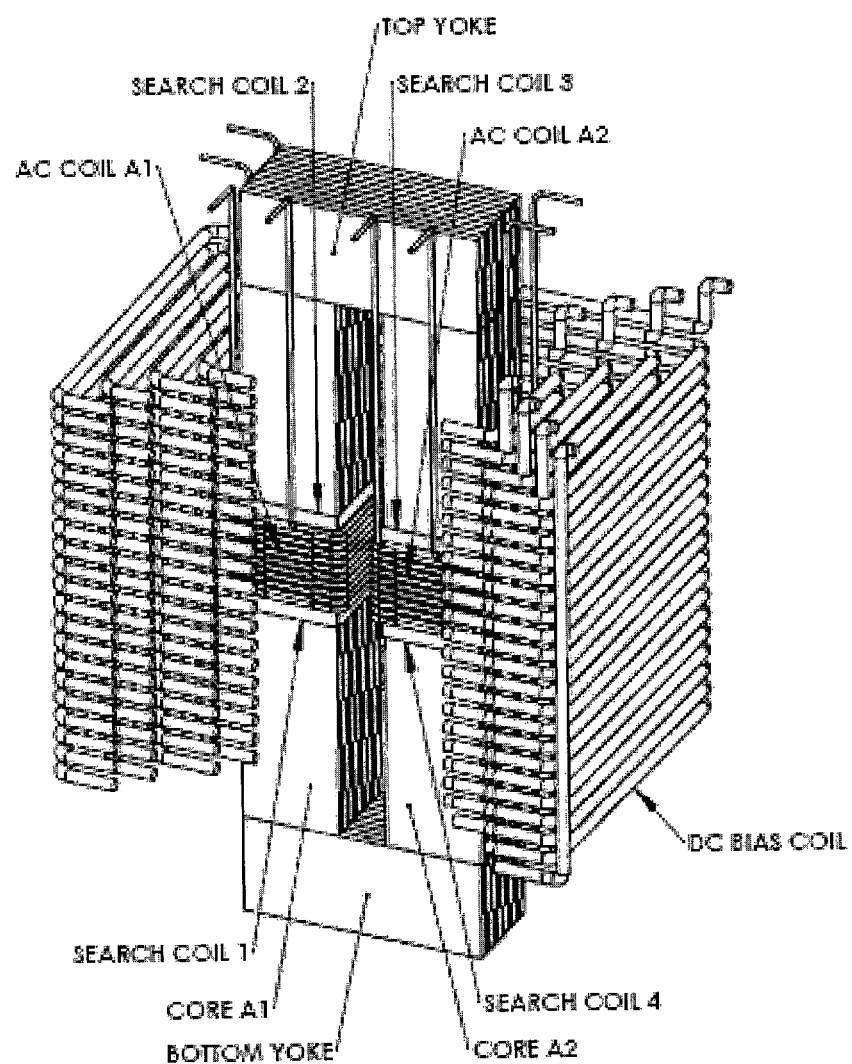
FIG. 27 shows the Experimental arrangement of AC & DC coils for the measurement and characterisation of the flux density, AC un-faulted insertion impedance, and fault current limiting ability of the yoked FCL and with electrical interconnections on each phase according to that detailed in FIG. 8.

FIG. 27 shows an alternative experimental arrangement of the open core FCL which includes yokes between the cores and is designed to decrease the DC bias ampere-turns required for low insertion impedance. Details of the design as are follows:
High permeability core dimensions: 100 mm×100 mm×570 mm (High)
Yoke dimensions: 100 mm×100 mm×250 mm (High)
Number of turns on each AC coil core: 20
Number of turns on DC biasing coil: 100

Figure 28:
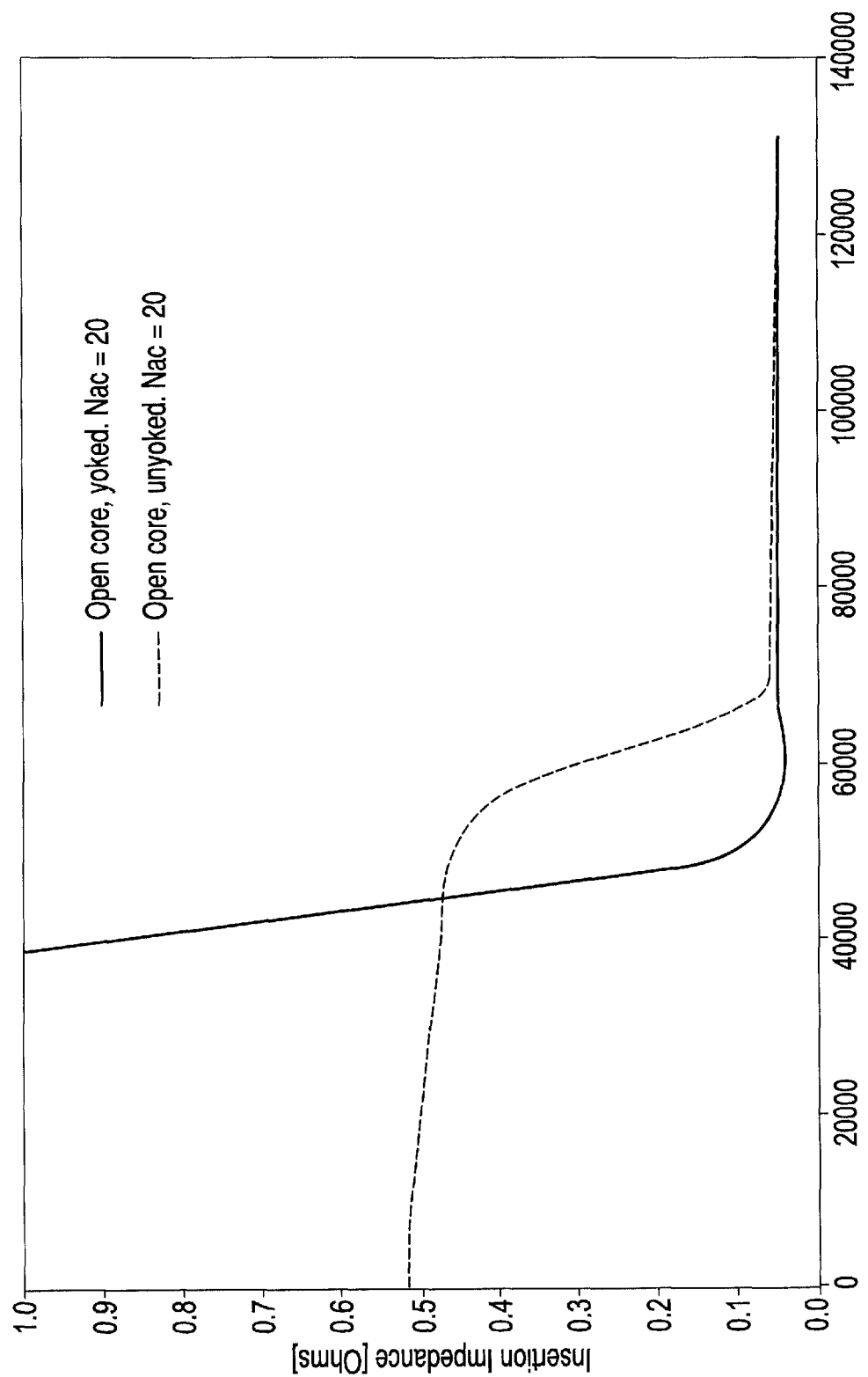
FIG. 28 shows the measured un-faulted steady state insertion impedance of the open core yoked FCL experimental arrangement compared to that measured on the unyoked open core FCL with limbs of the same dimensions.

A comparison between the insertion impedance results obtained for the yoked and unyoked configurations is given in FIG. 28 where the measured 50. Hz un-faulted steady state insertion impedance characteristics of an open core FCL with and without yokes is shown.

Figure 29:
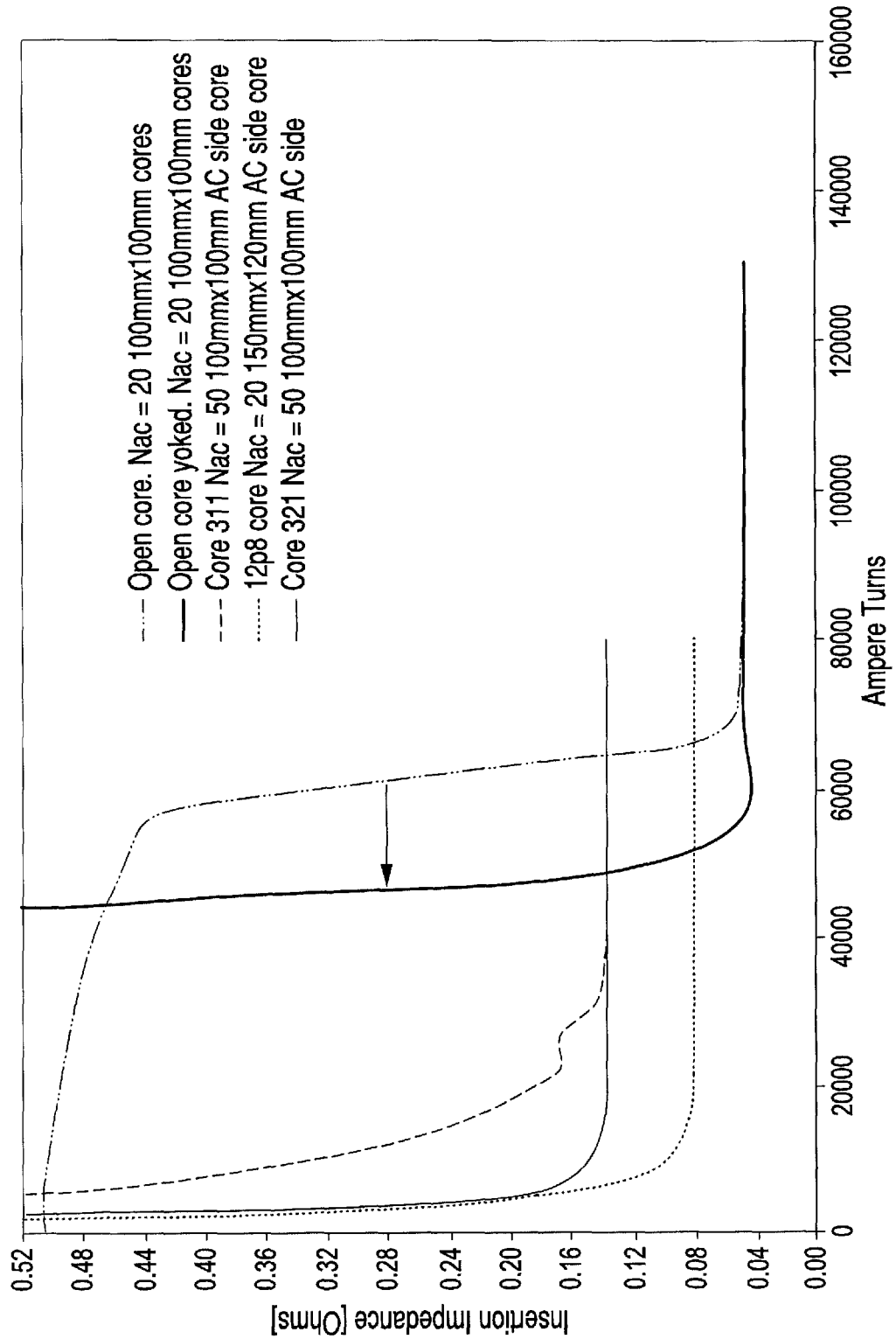
FIG. 29 shows the measured un-faulted insertion impedance comparison between yoked and unyoked open core arrangements and compared to various closed core arrangements.

FIG. 29 shows that yoking of the core arrangement within the DC bias coil shifts the magnetization curve to the left, allowing less ampere-turns to be used to obtain minimum insertion impedance.

Figure 30:
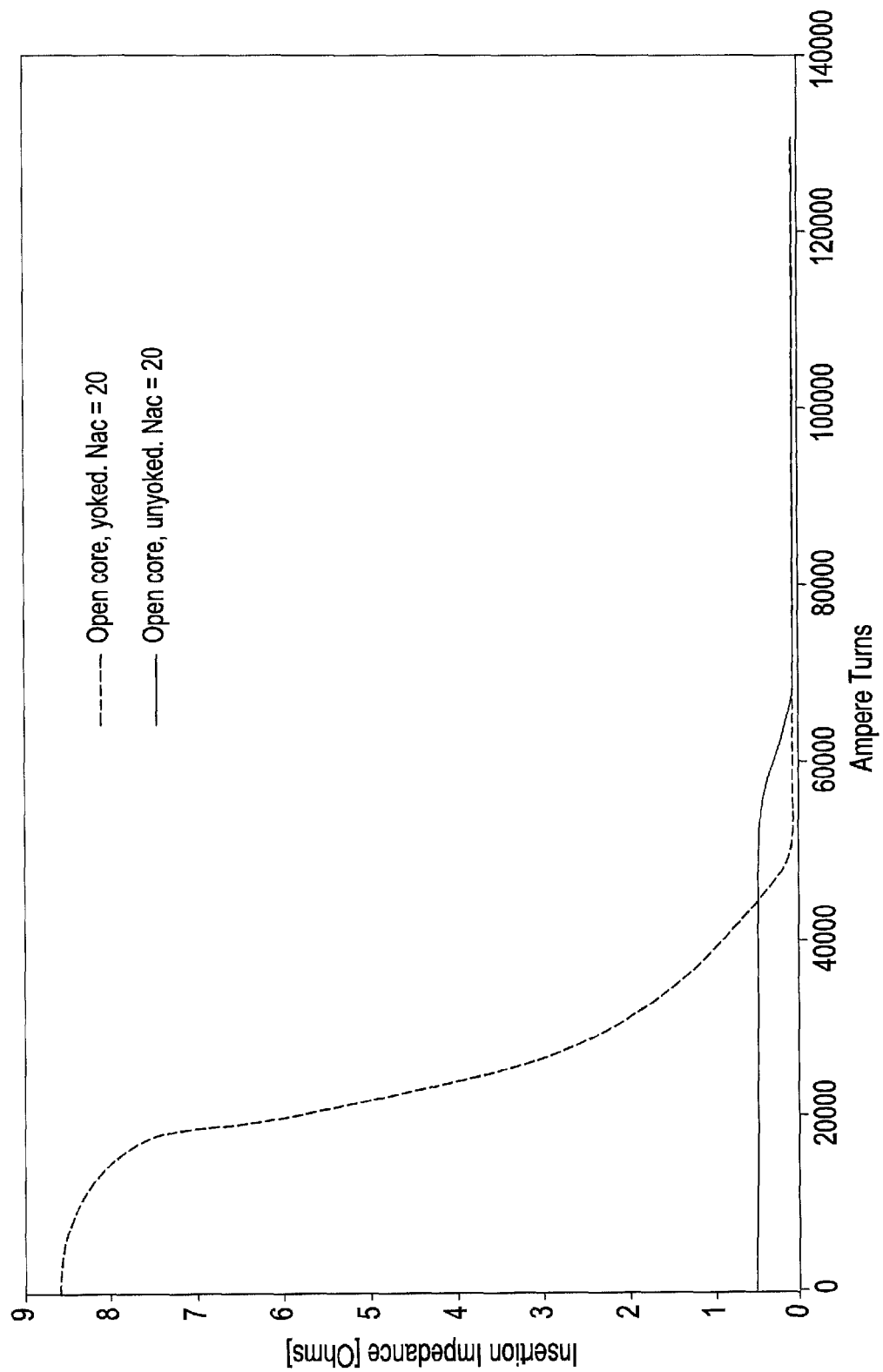
FIG. 30 shows the measured un-faulted steady state insertion impedance of the open core yoked FCL experimental arrangement compared to that measured on the unyoked open core FCL with limbs of the same dimensions.

FIG. 30 shows the full range of insertion impedance for the yoked configuration, which shows significant improvement in the fault impedance of this arrangement at lower DC applied ampere-turns.

Figure 31:
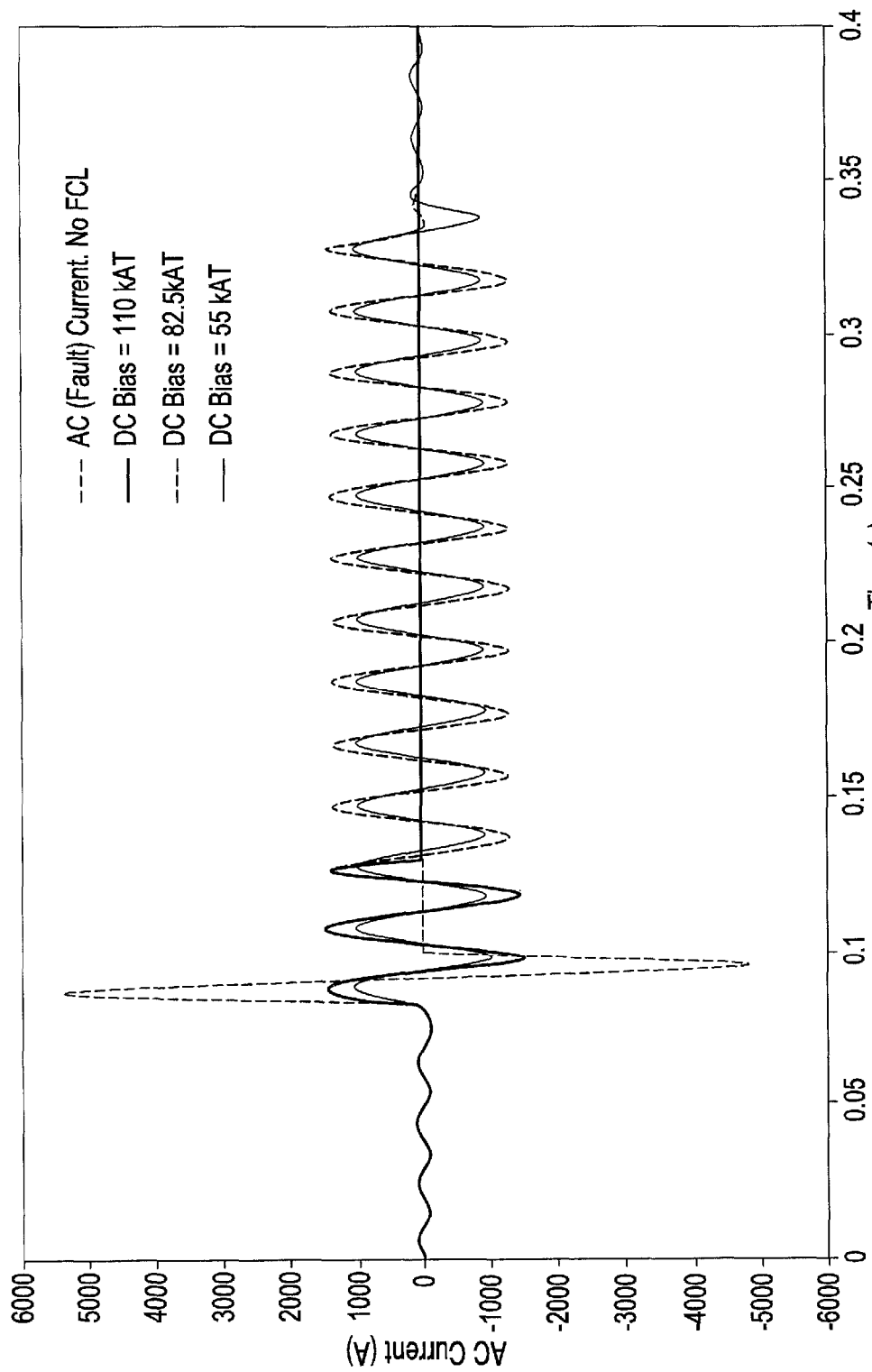
FIG. 31 shows the fault current characterisation plots for a yoked open core FCL as a function of the DC bias.

Fault current plots for the yoked open core FCL experimental arrangement in FIG. 31 show the difference the presence of the yoked FCL makes for various DC biasing modes in comparison to a system without the FCL.

Figure 32:
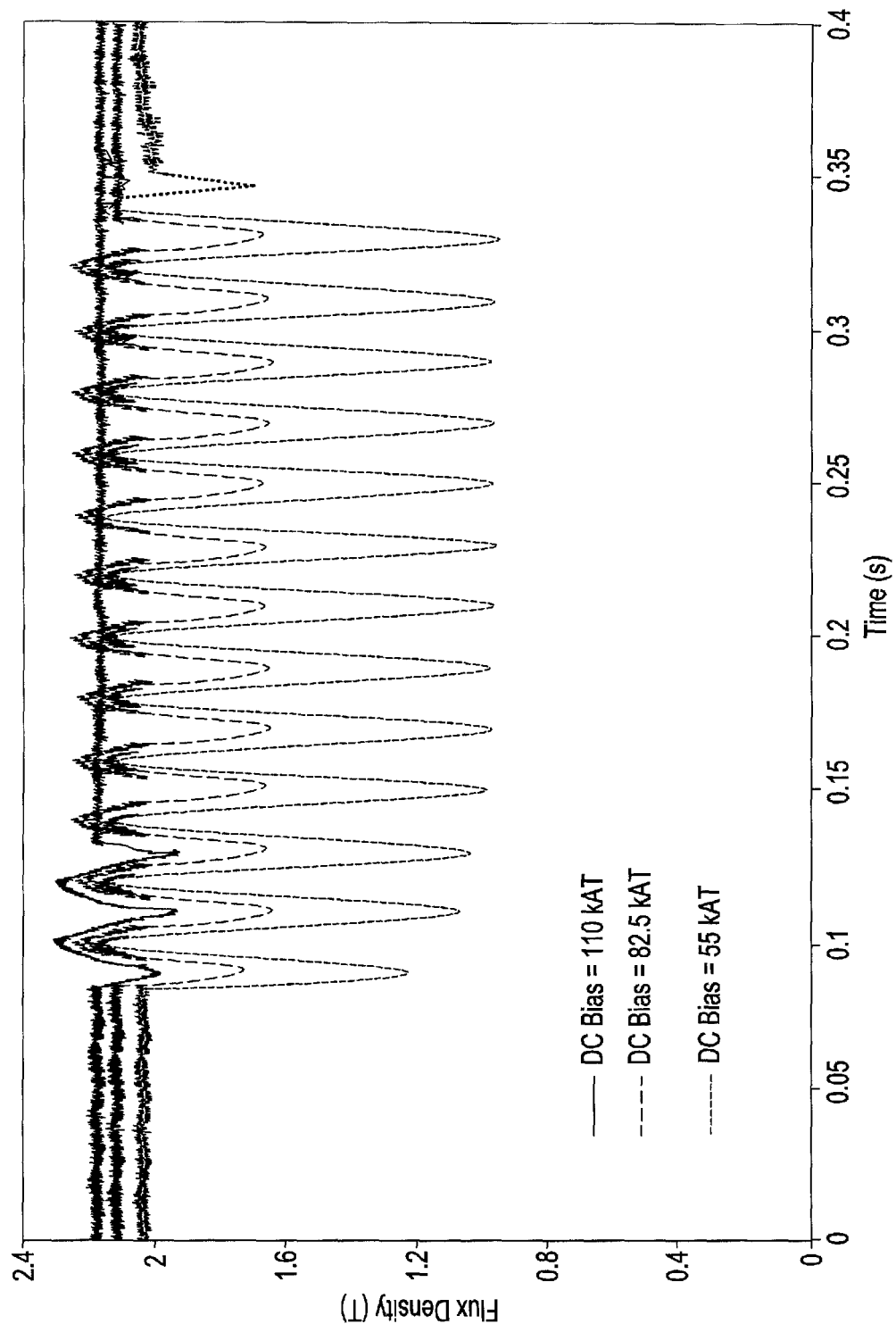
FIG. 32 shows the flux density plot of the open core FCL experimental arrangement, taken from a search coil around a steel limb and located at the top of the AC coil of a yoked open core FCL.

The magnetic flux density in the highly permeable core material measured at the top of the AC coil was also measured in FIG. 32 indicating the same characteristic behaviour as in the non yoked open core experimental arrangement.

Figure 33:
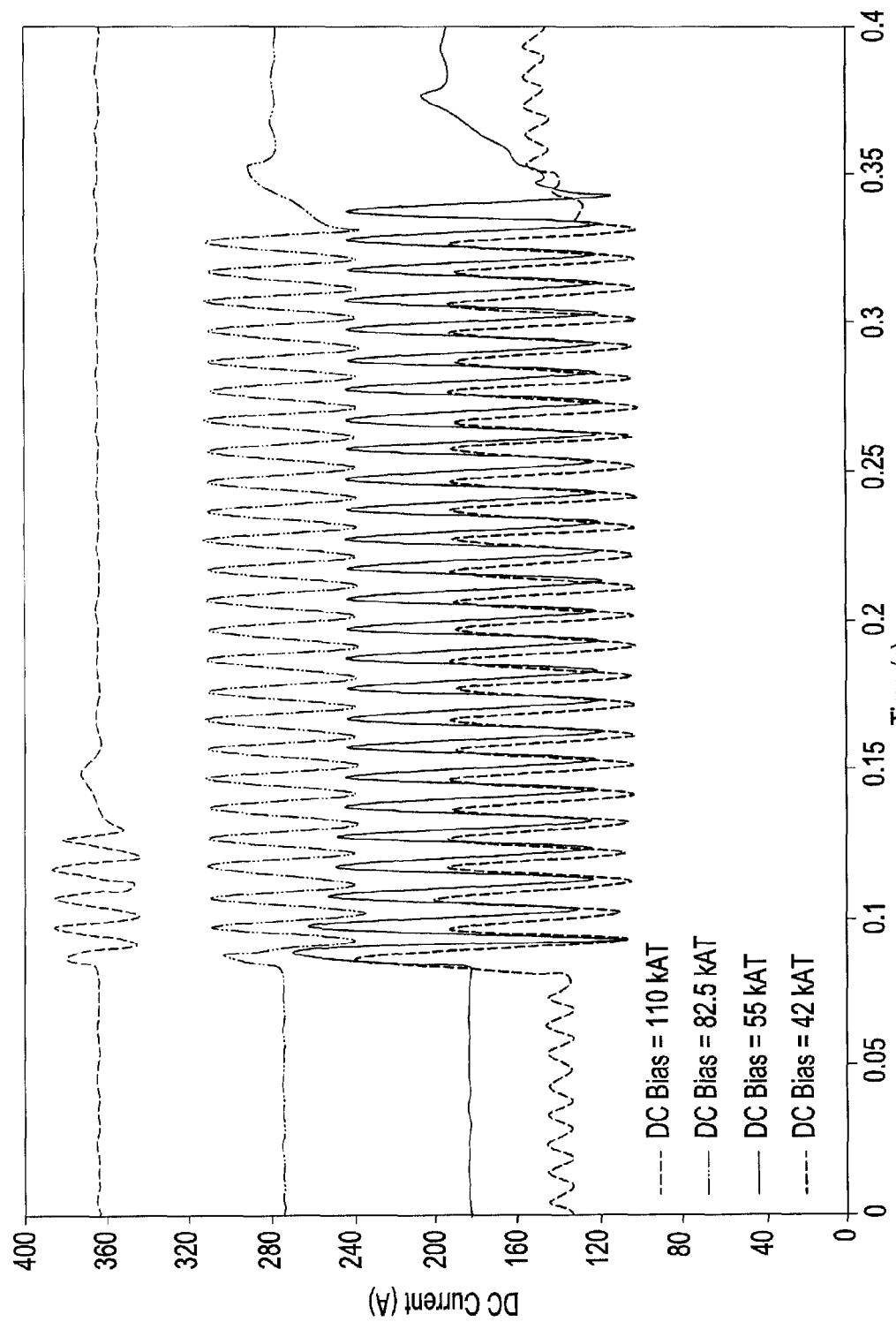
FIG. 33 shows the DC circuit transient current characteristics of the yoked open core FCL experimental arrangement.

FIG. 33 shows the DC circuit transient current waveforms across a range of different bias levels. As for the unyoked open core FCL arrangement, the induced transient DC current is insignificant for sufficiently biased cores.

The primary benefit of arranging the DC and AC coils as illustrated in the embodiments is that the AC coils experience the full DC flux density of the steel core under the DC coil. Classic saturated FCL designs suffer from the disadvantage of transporting the flux from the DC limbs to the AC limbs through the upper and lower yokes and around the mitered joints within the core. The present embodiments dispenses with the yoke and the AC side limbs making flux transport from the DC to the AC coils almost 100% efficient.

It will be appreciated that in the illustrated embodiments each fault current limiter includes at least one input terminal in the form of a high voltage bushing for electrically connecting to a power source, such as a transformer, that provides a load current. Each of the embodiments also includes at least one output terminal, also in the form of one or more high voltage bushings, for electrically connecting with a load circuit, such as an electrical distribution system, that draws the load current. Also included is a magnetically saturable core and at least one AC coil—typically one coil for each phase of the load current—that is wound about a longitudinal portion of the core for carrying the load current between the input terminal or terminals and the output terminal or terminals. A DC coil induces a magnetic field in at least the portion of the core and extends about a longitudinal intermediate zone that receives the core and the AC coil. In the illustrated embodiments, the intermediate zones are defined by respective tanks. The field induced by the DC coil magnetically biases the core such that the AC coil moves from a low impedance state to a high impedance state in response to one or more characteristics of the load current.

Figure 35:
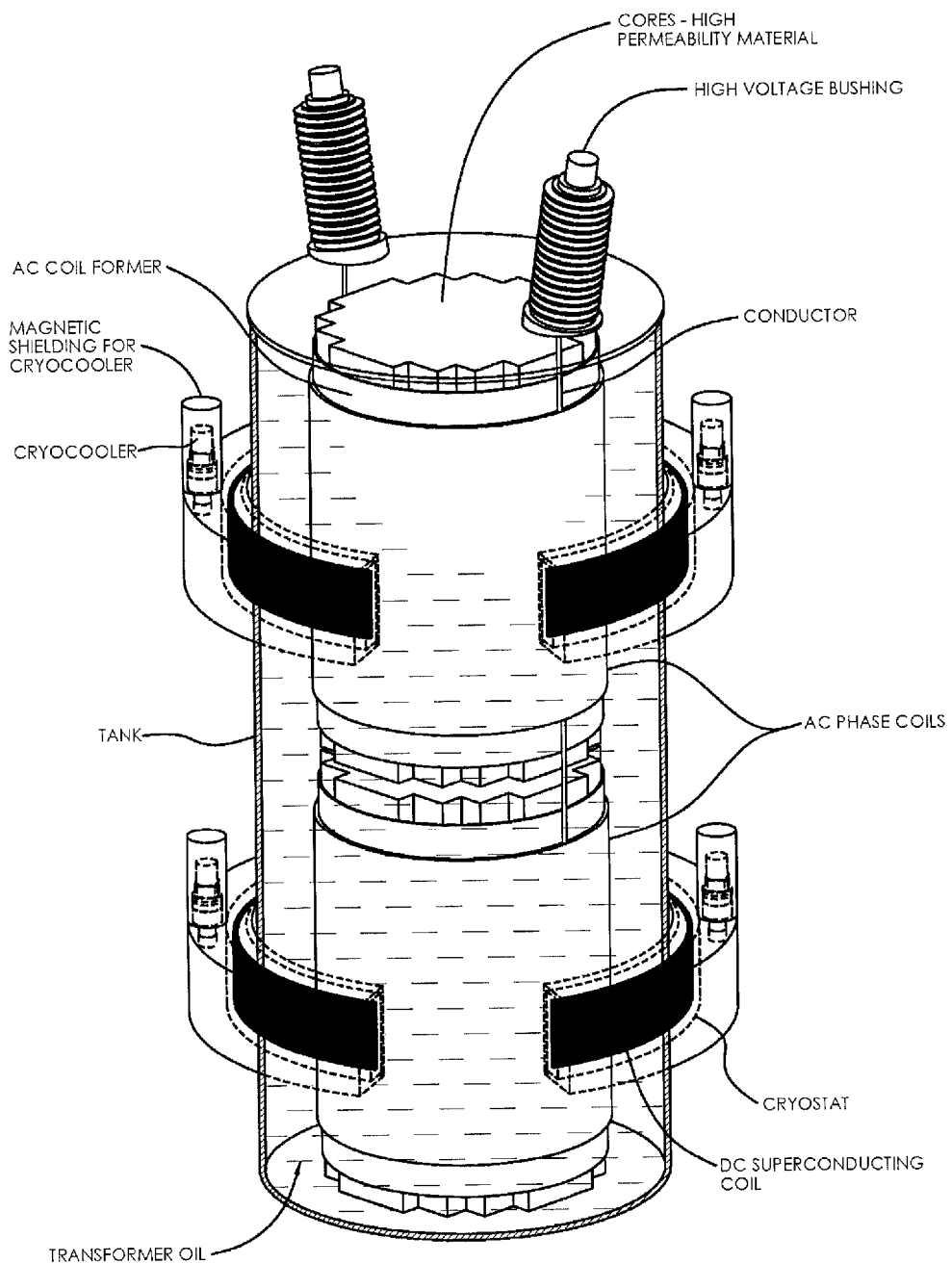
FIG. 35 is a schematic perspective view of a single phase open core FCL in which the core includes two steel posts that are stacked end-to-end.
Figure 36:
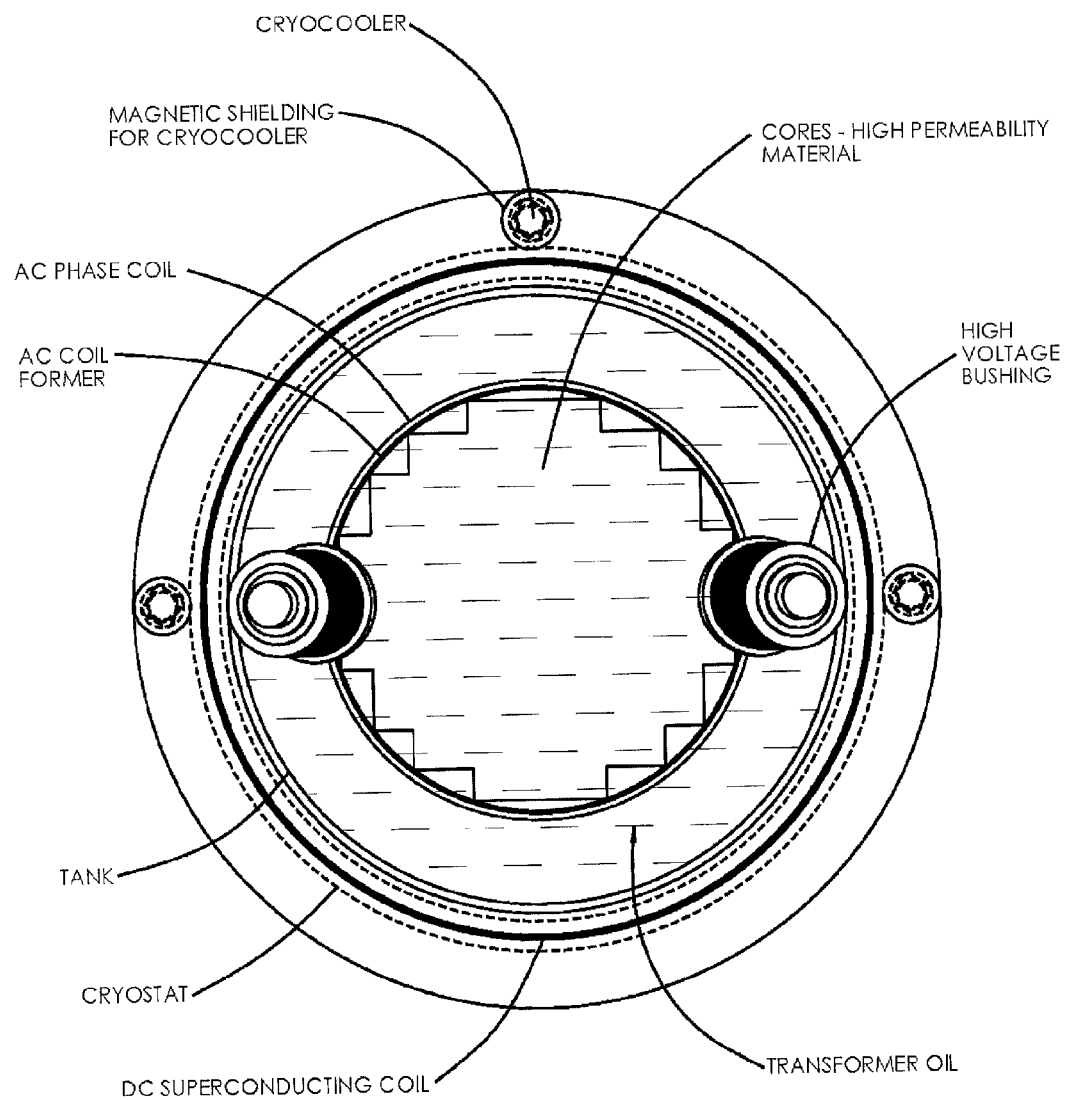
FIG. 36 is a top view of the FCL of FIG. 35.

It will be appreciated that in many applications, particularly where an FCL is to be retro-fitted to an existing facility, the physical space available to accommodate the FCL is often limited. Even more usually, the most significant physical constraint is the footprint available for the FCL. Reference is now made to FIGS. 35 and 36 where there is illustrated a single phase open core FCL that has been developed for small footprint applications. The FCL includes an input terminal in the form of a high voltage bushing for electrically connecting to a power source (not shown) that provides a load current. An output terminal, in the form of a further high voltage bushing, electrically connects with a load circuit (not shown) that draws the load current. A magnetically saturable core has the form of two like high permeability laminated steel posts that extend longitudinally and which are stacked with each other end to end. An AC coil has two coil segments that are oppositely wound about respective longitudinal portions of the posts for carrying the load current between the input terminal and the output terminal. A DC coil, in the form of two spaced apart sub-coils, induces a magnetic field in at least the portions of the posts and extends about a longitudinal intermediate zone that receives the core and the AC coil. The zone, in this embodiment, is defined by the tank. The field magnetically biases the posts such that the AC coil moves from a low impedance state to a high impedance state in response to one or more characteristics of the load current.

Figure 37:
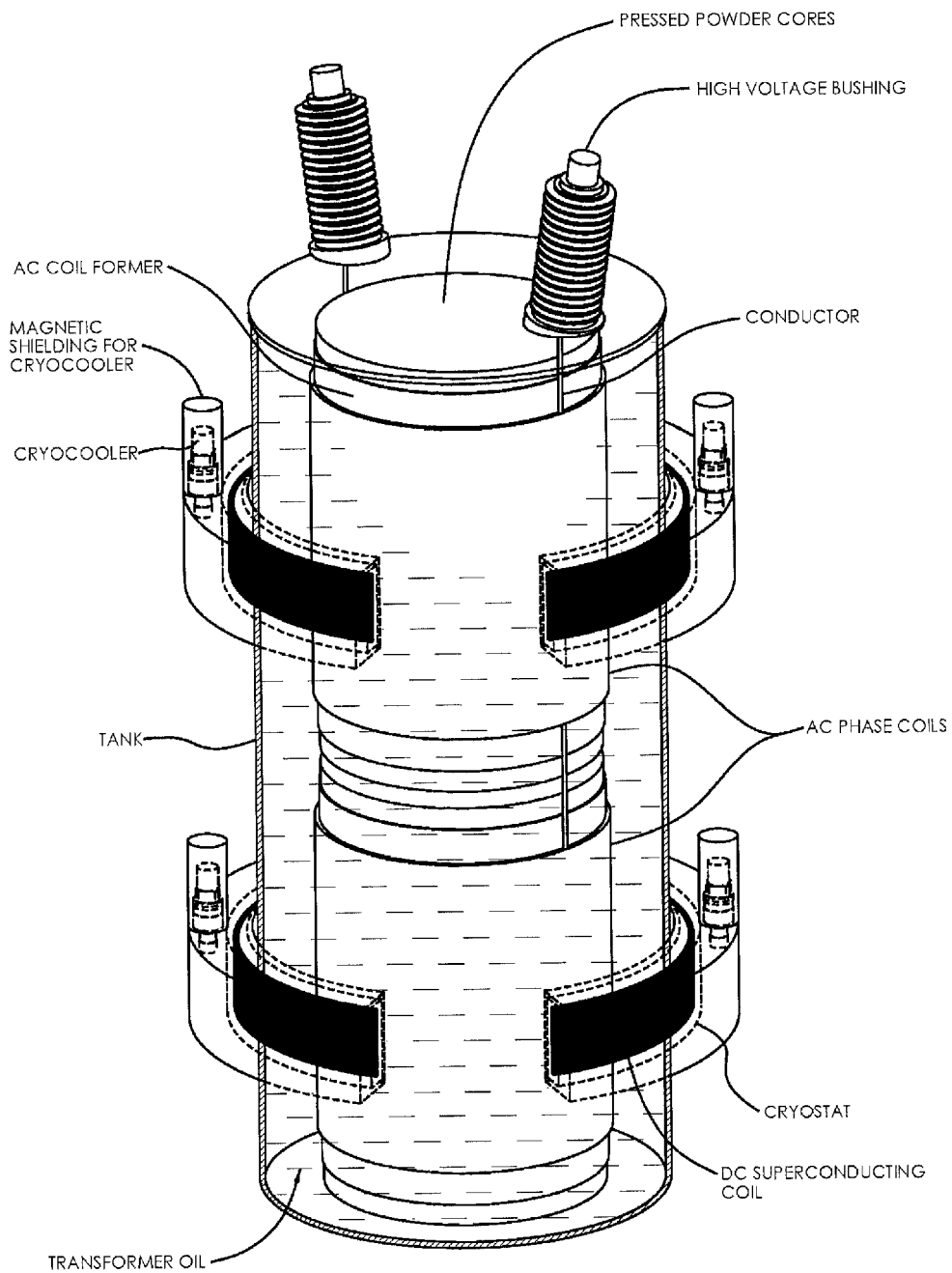
FIG. 37 is a schematic perspective view of a single phase open core FCL in which the core includes a single post of pressed power.
Figure 38:
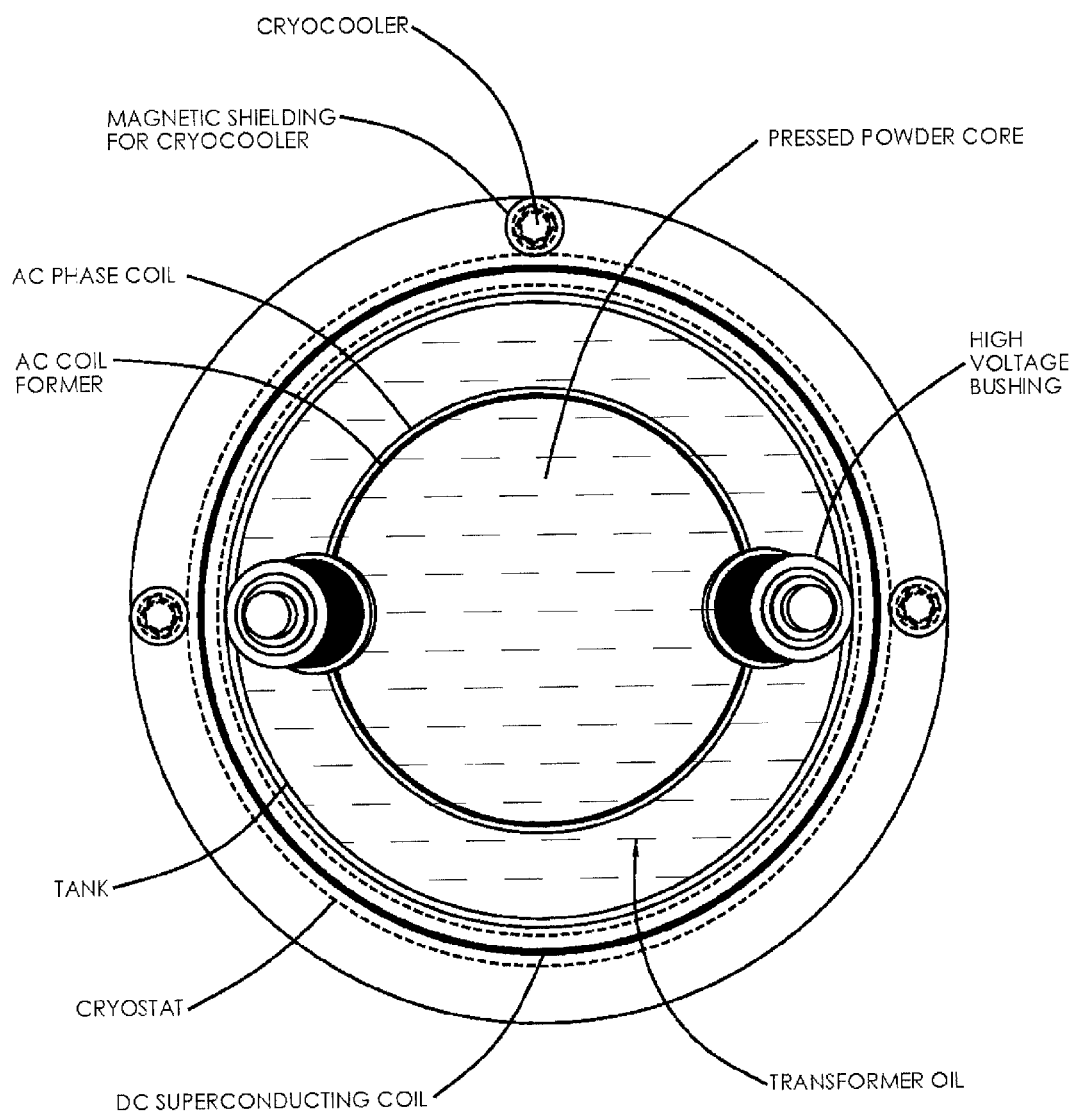
FIG. 38 is a top view of the FCL of FIG. 37.

A further small footprint embodiment is illustrated in FIGS. 37 and 38. In this embodiment, use is made of a pressed power core. This provides a higher fill factor of high permeability material within the cross-sectional area of the AC coil than is able to be achieved with laminations. Accordingly, for the same footprint, and assuming all else is equal, the FCL of this embodiment provides improved performance over than of FIGS. 35 and 36.

In a further embodiment, the FCL of FIGS. 37 and 38 is developed to provide the same performance as the FCL of FIGS. 35 and 36. Due to the higher fill factor, this further embodiment has a smaller footprint than the FCL of FIGS. 37 and 38.

Figure 39:
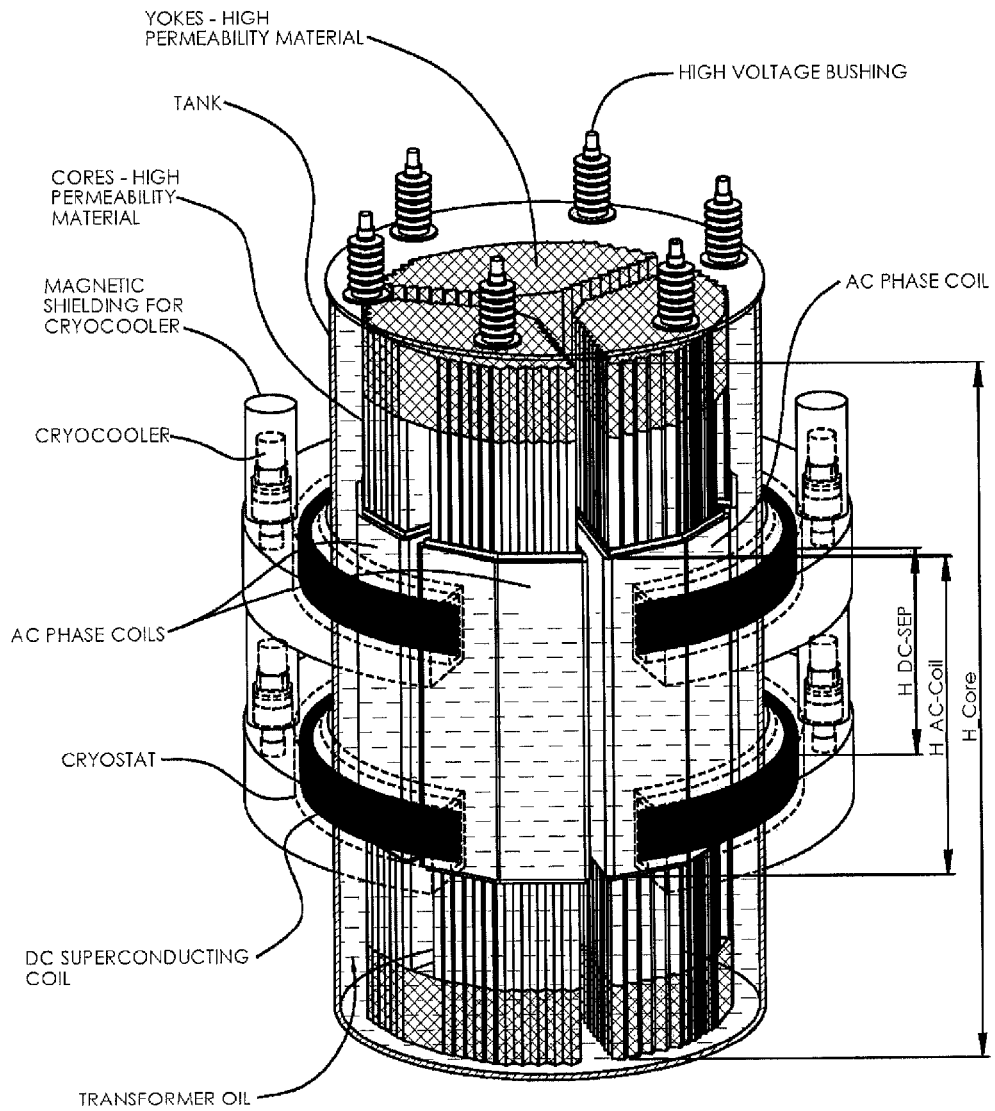
FIG. 39 is a schematic perspective view of a further embodiment of an FCL having a generally circular footprint and which includes yokes between the posts within the core.
Figure 40:
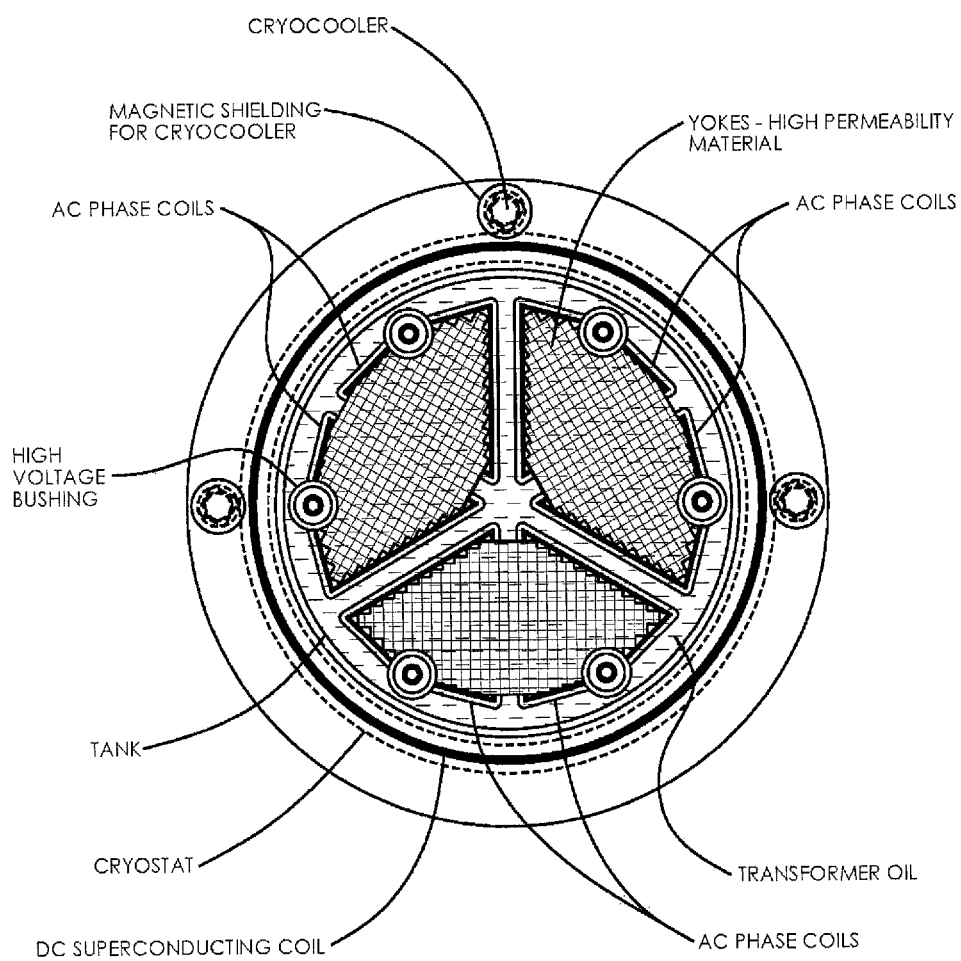
FIG. 40 is a schematic top view of the FCL of FIG. 39

Another embodiment of the FCL is illustrated in FIGS. 39 and 40. This embodiment is a three phase open core FCL having three pairs of parallel and longitudinally coextensive posts—one pair of posts for each phase—for collectively defining the core. The posts have a constant and uniform transverse cross-section that is asymmetric. The pairs of posts include yokes, and the posts, the associated AC coils and the yokes are all disposed within a tank containing a dielectric medium that also acts as a cooling medium.

Figure 41:
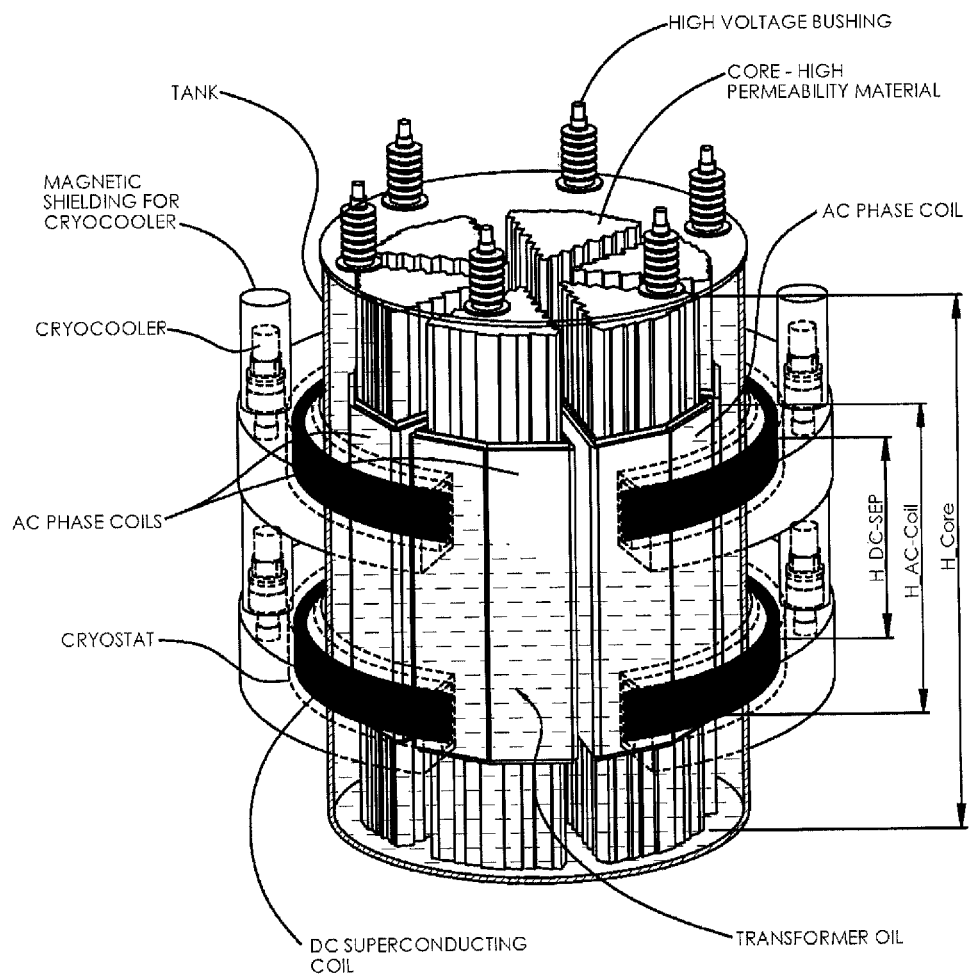
FIG. 41 is a schematic perspective view of an FCL similar to that of FIG. 39 sans the yokes.
Figure 42:
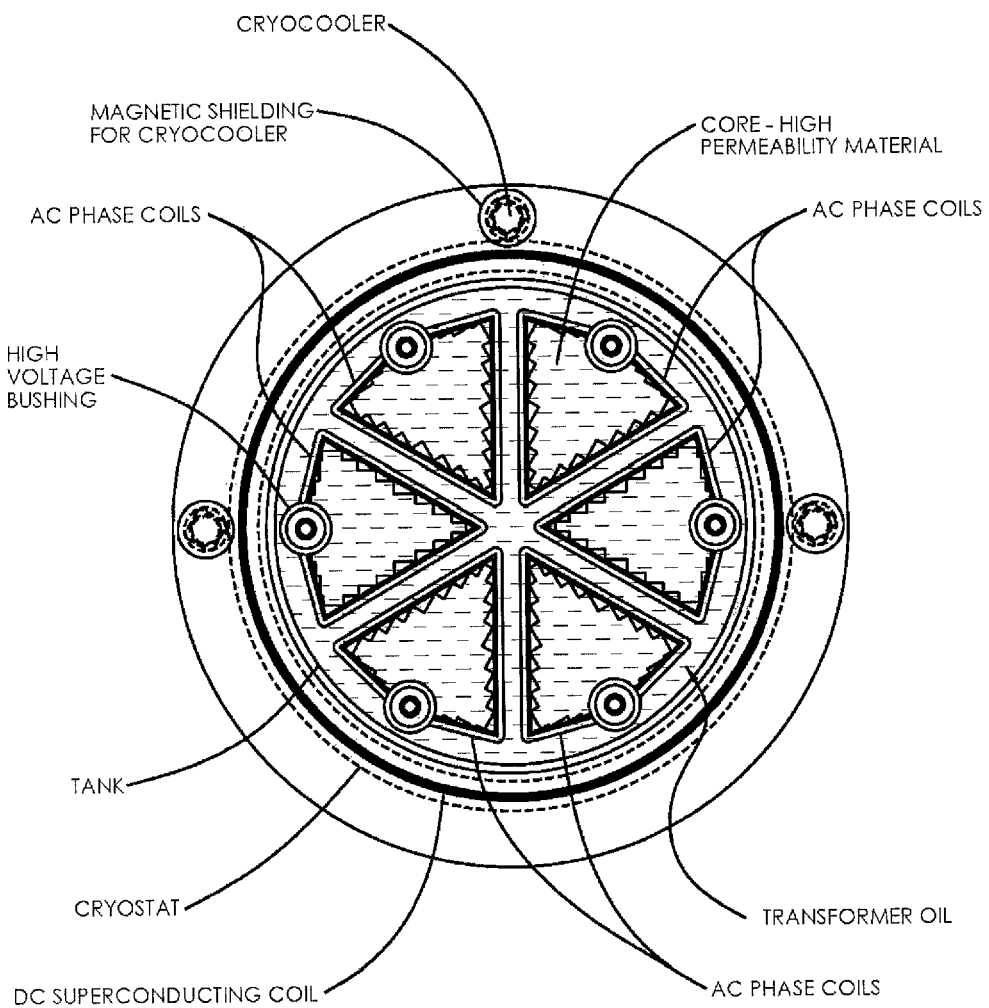
FIG. 42 is a top view of the FCL of FIG. 41.

FIGS. 41 and 42 illustrate a further embodiment that is similar to that of FIGS. 39 and 40, with the major difference being the omission of yokes to further reduce the amount of volume occupied by the FCL.

It will be appreciated that the fault current limiters illustrated in FIGS. 39 to 42 include like posts having asymmetric posts that are arranged relative to each other to define generally a cylinder. This shape and relative arrangement or relative orientation of the posts also contributes to a small footprint for the FCL.

Figure 43:
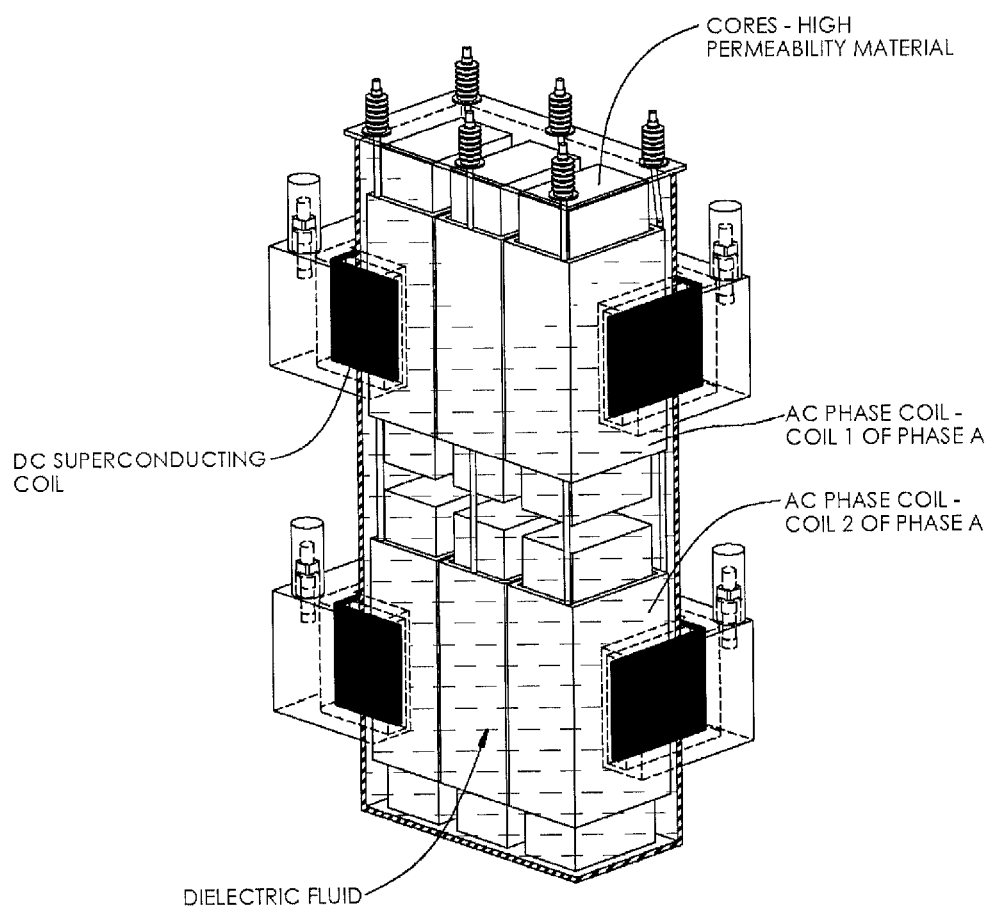
FIG. 43 is a schematic perspective view of an FCL that includes a core having rectangular cross-section posts arranged in a stacked 3×2 array.

In other embodiments different approaches are taken to optimize the footprint for the FCL, or to otherwise address any accommodation specifications for a given site. For example, reference is made to FIG. 43 that illustrates an FCL that includes a core having rectangular cross-section posts arranged in a stacked 3×2 array. The two coil segments for the AC coil of the same phase are arranged one under the other. This configuration of open core FCL is used, for example, where the footprint of a site is limited, and a greater height is permitted.

Figure 44:
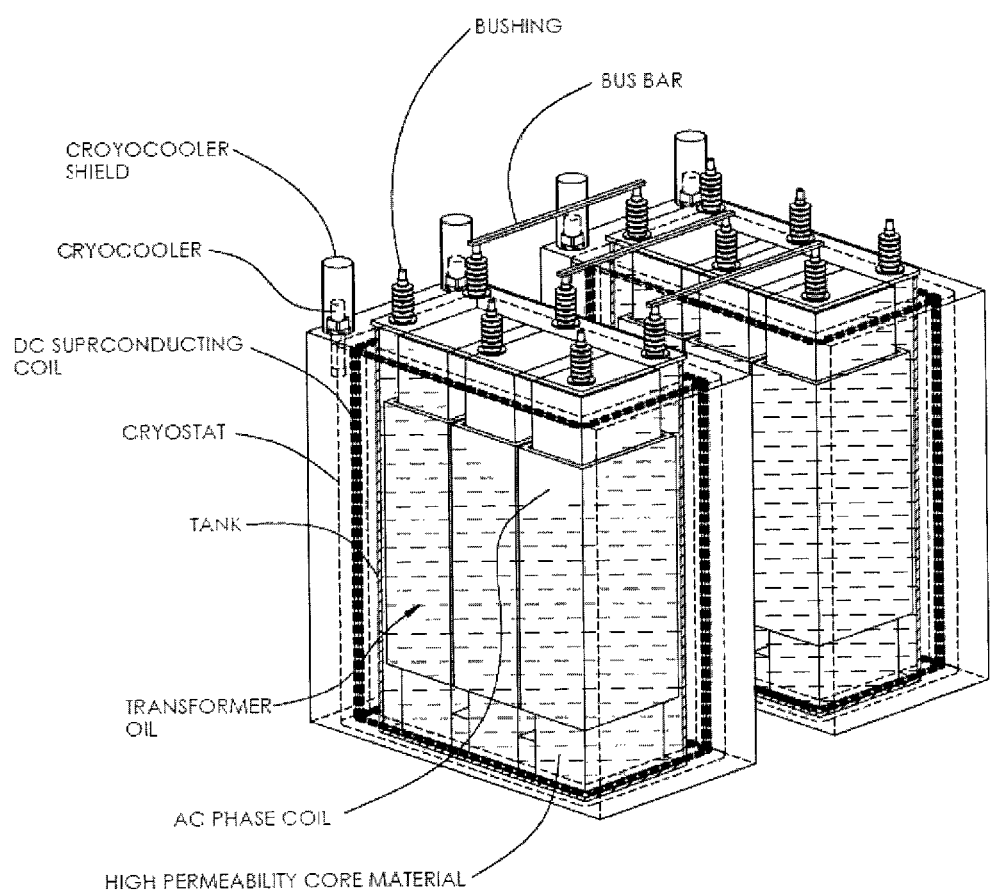
FIG. 44 is a schematic perspective view of an FCL that includes a core having rectangular cross-section posts arranged in a side-by-side 3×2 array.

A further embodiment is illustrated in FIG. 44 where an FCL includes a core having rectangular cross-section posts arranged in a side-by-side 3×2 array. This configuration of open core FCL is used, for example, where the height requirements are limited, but a greater footprint is permitted.

Figure 45:
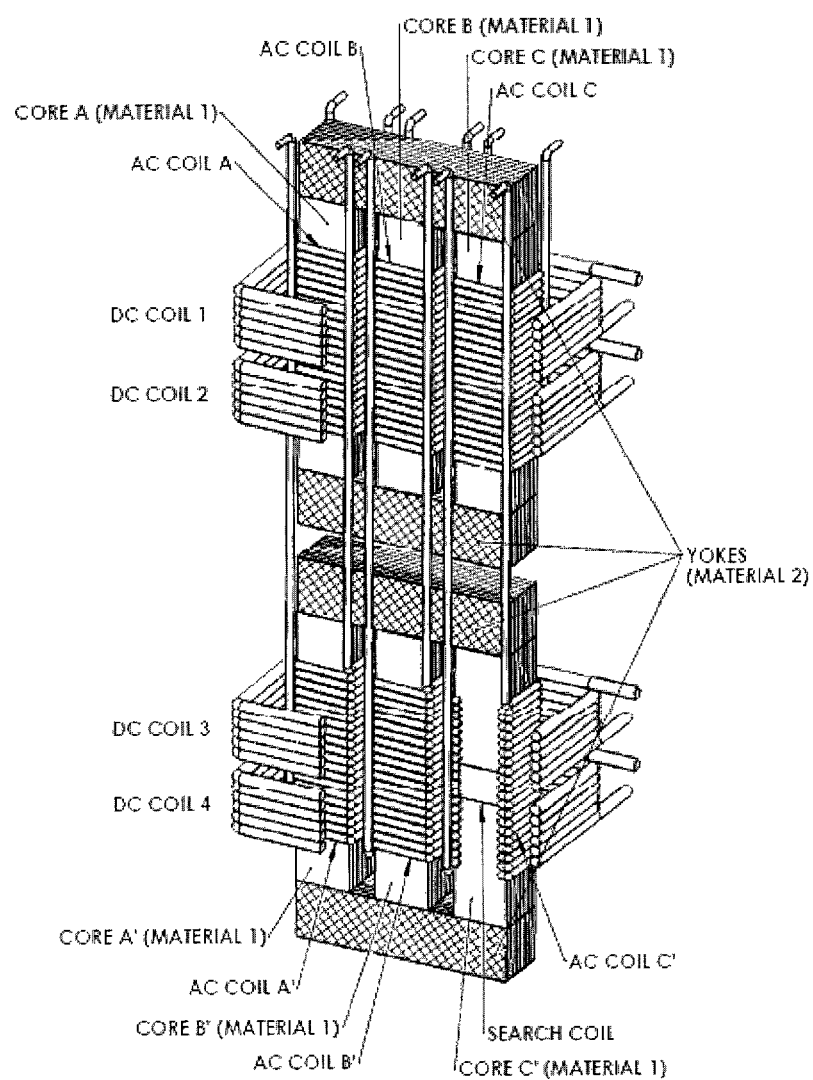
FIG. 45 is a schematic perspective view of an FCL that includes a core having rectangular cross-section posts arranged in a stacked 3×2 array which are yoked.

A further example of an FCL is illustrated in FIG. 45 that includes a core having rectangular cross-section posts arranged in a stacked 3×2 array which are yoked.

Compared to the known picture frame style "closed core" saturable core fault current limiter, the above described embodiments have the following advantages:

A significant reduction in the mass of steel required and hence reduced cost of manufacture, transportation, and site location.

For similar performance, a reduction in the footprint. This is particularly advantageous in easing placement issues at dense urban locations.

In those cases where a superconductor is employed for the DC bias coil or coils, a lower cryostat surface area. This results in less steady state ambient heat loss, and hence a lower cryocooler power requirement.

Mechanical de-coupling of the DC bias coil and cryostat from the AC phase coils and steel core. This allows the oil tank to be lowered into the DC coil warm bore area, or the DC coils may be lowered over the oil tanks containing the phase coils and cores.

Compared to the alternative fault current limiter arrangements such as resistive types, resistive types with external or internal reactor, shielded core, solid state, the saturable open core fault current limiter has these advantages:

The open core fault current limiter will not do harm to a protected line and does not need to be isolated from a protected line if any aspect of the superconducting portion fails, whether this be the DC coil, vacuum system, or cryogenic system. Hence, the open core fault current limiters of the embodiments are inherently fail safe and are able to be left in the protected line under these conditions. Moreover, the redundancy associated with alarms and detection of internal faults is able to be much less stringent compared to designs which must be switched out of service for an internal fault.

None of the DC bias coils (whether it be a superconducting coil or otherwise) is directly connected to the high voltage or high current line of the grid or electricity supply that is being protected. Hence, simple, established and well known dielectric design procedures are able to be used to design the high voltage portion.

Liquid cryogens are not used as an AC dielectric and, hence, issues associated with these liquids do not exist in the design of the preferred embodiments, Superconducting elements are not stressed by the fault current. Accordingly, there is very little induction of current and voltage into the DC coil during a fault.

The superconductor does not quench during a fault and hence is able to be used in-line where auto re-closers or re-closing logic is employed on the breakers and isolators of a protected line.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby expressly incorporated into the description of the invention, with each claim standing on its own as a separate embodiment of this invention.

Further embodiments of the invention are disclosed in Australian Patent Application No. 2009901138 filed on 16 Mar. 2009 and from which priority is claimed. The detail of those embodiments is expressly incorporated herein by way of cross-reference.

Furthermore, while some embodiments described herein include some but not other features included in other embodiments, combinations of features of different embodiments—including those embodiments disclosed in the patent specifications from which priority benefit is claimed—are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Those skilled in the art will recognise that these are examples applied to specific designs that were manufactured and that detailed results for other designs with different construction details will differ. The main conclusions and pattern of results are to be considered.

Although the invention has been described with reference to specific examples it will be appreciated by those skilled in the art that it may be embodied in many other forms.

The invention claimed is:

1. A fault current limiter, comprising:
an input terminal electrically connecting to a power source that provides a load current;
an output terminal electrically connecting with a load circuit that draws the load current;
a magnetically saturable core;
an AC coil wound about a longitudinal portion of the core for carrying the load current between the input terminal and the output terminal;
an enclosure for housing the magnetically saturable core and AC coil, wherein the enclosure includes a cooling means in addition to a dielectric material; and
at least one DC coil for inducing a magnetic field in at least the portion of the core and extending about a longitudinal intermediate zone that receives the core and the AC coil, wherein the field magnetically biases the core such that the AC coil moves from a low impedance state to a high impedance state in response to one or more characteristics of the load current.

2. A fault current limiter according to claim 1, wherein the limiter includes at least two DC coils.

3. A fault current limiter according to claim 2, wherein the DC coils are spaced apart.

4. A fault current limiter according to claim 1, wherein, in the low impedance state, the portion is magnetically saturated.

5. A fault current limiter according to claim 4, wherein, in the low impedance state, the core is magnetically saturated longitudinally beyond the portion.

6. A fault current limiter according to claim 1, wherein, in the high impedance state, the portion is out of magnetic saturation.

7. A fault current limiter according to claim 1, wherein in the low impedance state, the impedance of the AC coil is substantially equal to the theoretical air core impedance of the AC coil.

8. A fault current limiter according to claim 1, wherein the DC coil includes a high conductivity material.

9. A fault current limiter according to claim 8, wherein the high conductivity material is copper.

10. A fault current limiter according to claim 8, wherein the high conductivity material is aluminium.

11. A fault current limiter according to claim 8, wherein the high conductivity material is a high temperature superconductive material.

12. A fault current limiter according to claim 8, wherein the high conductivity material is a low temperature superconductive material.

13. A fault current limiter according to claim 1, wherein the DC coil is disposed outside of and surrounding the enclosure.

14. A fault current limiter according to claim 1, wherein the dielectric material is in the form of a liquid or a gas.

15. A fault current limiter according to claim 1, wherein the AC coil extends longitudinally beyond the DC coil.

16. A fault current limiter accordingly to claim 1, wherein the DC coil is in an open-core arrangement with the AC coil.

* * * * *